(12) United States Patent
Shoji et al.

(10) Patent No.: US 7,388,819 B2
(45) Date of Patent: Jun. 17, 2008

(54) OPTICAL DISC APPARATUS AND RECORDING POWER DETERMINING METHOD THEREOF

(75) Inventors: Mamoru Shoji, Osaka (JP); Shuichi Tasaka, Hyogo (JP); Eiichi Igami, Kyoto (JP); Kenji Koishi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 11/580,836

(22) Filed: Oct. 16, 2006

(65) Prior Publication Data

US 2007/0030778 A1 Feb. 8, 2007

Related U.S. Application Data

(62) Division of application No. 11/149,172, filed on Jun. 10, 2005, now Pat. No. 7,151,728, which is a division of application No. 11/010,482, filed on Dec. 14, 2004, now Pat. No. 7,095,692, which is a division of application No. 10/106,041, filed on Mar. 27, 2002, now Pat. No. 6,845,071.

(30) Foreign Application Priority Data

Mar. 28, 2001 (JP) ............................. 2001-092487

(51) Int. Cl.
*G11B 7/00* (2006.01)

(52) U.S. Cl. .................................. 369/47.53
(58) Field of Classification Search ............ 369/275.3, 369/116, 120, 121, 122, 47.5, 47.51, 47.53
See application file for complete search history.

(56) References Cited

U.S. PATENT DOCUMENTS

| 5,703,841 | A | 12/1997 | Hiroki | |
| 5,999,502 | A * | 12/1999 | Nakata et al. | ........... 369/44.26 |
| 6,515,949 | B2 | 2/2003 | Masaki et al. | |
| 6,711,107 | B2 | 3/2004 | Chao et al. | |
| 6,842,412 | B2 | 1/2005 | Ushiyama et al. | |

FOREIGN PATENT DOCUMENTS

| JP | 7-287847 | 10/1995 |
| JP | 10-106005 | 4/1998 |
| JP | 11-175977 | 7/1999 |
| JP | 2000-040231 | 2/2000 |
| WO | 02/13192 | 2/2002 |

* cited by examiner

*Primary Examiner*—Nabil Hindi
(74) *Attorney, Agent, or Firm*—Wenderoth, Lind & Ponack, L.L.P.

(57) ABSTRACT

A method of determining a recording power used to record information to an optical disc, includes carrying out test recording which records predetermined data to a predetermined area of the optical disc to determine the recording power, and recording predetermined data with a power equal to or more than the determined recording power to an area adjacent to the predetermined area.

2 Claims, 23 Drawing Sheets

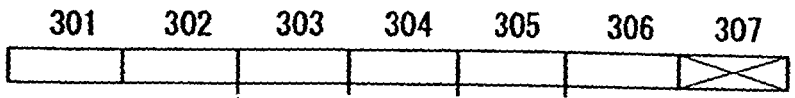
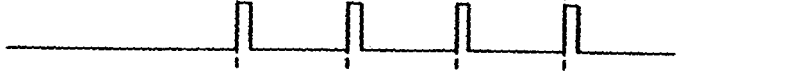
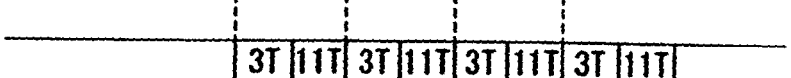
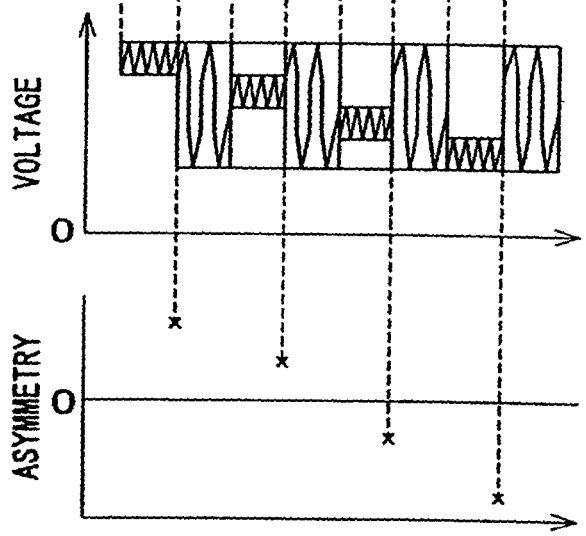
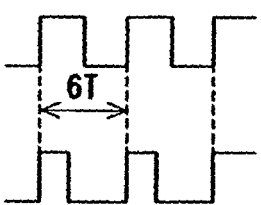
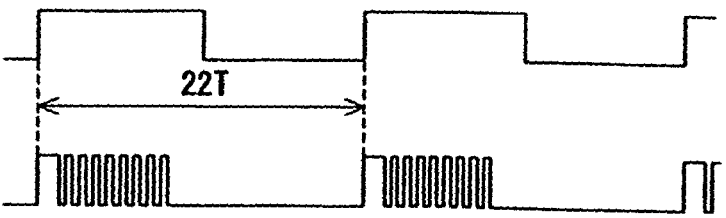

Fig. 10

| | DIRECTION OF LIGH SPOT | DIRECTION OF USING TEST RECORDING AREA | RECORDING POWER | RECORDING POSITION WITH OPTIMUM POWER |
|---|---|---|---|---|
| (A) | IN → OUT | OUT → IN | HIGH → LOW | IN |
| (B) | IN → OUT | IN → OUT | LOW → HIGH | OUT |
| (C) | OUT → IN | OUT → IN | LOW → HIGH | IN |
| (D) | OUT → IN | IN → OUT | HIGH → LOW | OUT |

Fig. 18

| | FIRST RECORDING LAYER | | | | SECOND RECORDING LAYER | | | |
|---|---|---|---|---|---|---|---|---|
| | DIRECTION OF LIGHT SPOT | DIRECTION OF USING TEST RECORDING AREA | RECORDING POWER | RECORDING POSITION WITH OPTIMUM POWER | DIRECTION OF LIGHT SPOT | DIRECTION OF USING TEST RECORDING AREA | RECORDING POWER | RECORDING POSITION WITH OPTIMUM POWER |
| (A) | IN → OUT | OUT → IN | HIGH → LOW | IN | IN → OUT | OUT → IN | HIGH → LOW | IN |
| (B) | IN → OUT | OUT → IN | HIGH → LOW | IN | IN → OUT | IN → OUT | LOW → HIGH | OUT |
| (C) | IN → OUT | IN → OUT | LOW → HIGH | OUT | IN → OUT | OUT → IN | HIGH → LOW | IN |
| (D) | IN → OUT | IN → OUT | LOW → HIGH | OUT | IN → OUT | IN → OUT | LOW → HIGH | OUT |
| (E) | IN → OUT | OUT → IN | HIGH → LOW | IN | IN → OUT | OUT → IN | LOW → HIGH | IN |
| (F) | IN → OUT | OUT → IN | HIGH → LOW | IN | OUT → IN | IN → OUT | HIGH → LOW | OUT |
| (G) | IN → OUT | IN → OUT | LOW → HIGH | OUT | OUT → IN | OUT → IN | LOW → HIGH | IN |
| (H) | IN → OUT | IN → OUT | LOW → HIGH | OUT | OUT → IN | IN → OUT | HIGH → LOW | OUT |

FIRST RECORDING LAYER

SECOND RECORDING LAYER

OPTICAL DISC APPARATUS AND RECORDING POWER DETERMINING METHOD THEREOF

This application is a divisional application of Ser. No. 11/149,172, filed Jun. 10, 2005, now U.S. Pat. No. 7,151,728, which is a divisional application of Ser. No. 11/010,482, filed Dec. 14, 2004, now U.S. Pat. No. 7,095,692, which is a divisional application of Ser. No. 10/106,041, filed Mar. 27, 2002, now U.S. Pat. No. 6,845,071.

BACKGROUND OF THE INVENTION

1. Field of the Invention

The present invention relates to a method of determining optimum recording power in optical disc apparatus for recording information by irradiating optical discs with a laser beam.

2. Related Art

Optical discs have been extensively developed as a means for recording a large volume of data, and for one of them, there is a write-once type optical disc which utilizes the state change of organic pigment and can record information once only in one same place. In the optical disc that uses organic-based pigment for recording film, the vapor pressure in the vicinity of the surface of the recording portion is raised by irradiation of an optimum light beam and presses to expand the melted portion to the periphery to form a pit.

In recording information to such a kind of optical disc, it is important to optimize the irradiation power of light beam, and accordingly a method of carrying out test recording in the predetermined area of the optical disc has been extensively adopted. In such event, since the area once recorded cannot be reused in the write-once type optical disc, it is necessary to search for the unused area for carrying out the test recording. For example, the unused area can be found by detecting the reflecting light quantity by scanning the test recording area with light beam, using the difference of reflectance between the used area and the unused area.

However, because by the conventional technique, in the area where even though recording was carried out, the recording was not satisfactory due to, for example, stains of light pickup, etc., there was a problem in which changes of reflecting light quantity were small. Thus the used area was mistakenly judged to be an unused area during searching the test recording area and the test recording was carried out thereto.

SUMMARY OF THE INVENTION

It is an object of the present invention to provide a recording method capable of surely detecting the unused area for the test recording when the test recording is carried out in a write-once type optical discs.

In the first aspect of the invention, provided is a method of determining a recording power used to record information to an optical disc. The method includes determining the recording power by carrying out test recording which records predetermined data to a predetermined area of the optical disc, and recording predetermined data with a power equal to or more than the determined recording power to an area adjacent to the predetermined area.

On the optical disc, a light spot may move in the direction from the inner periphery to the outer periphery of the optical disc, and the predetermined area may be used from the outer part to carry out the test recording. In this case, the adjacent area may be on the inside of an area where the test recording has been carried out in the predetermined area.

Alternatively, on the optical disc, a light spot may move in the direction from the inner periphery to the outer periphery of the optical disc, and the predetermined area may be used from the inner part to carry out the test recording. In this case the adjacent area may be on the outside of an area where the test recording has been carried out in the predetermined area.

Alternatively, on the optical disc, a light spot may move in the direction from the outer periphery to the inner periphery of the optical disc, and the predetermined area may be used from the outer part to carry out the test recording. In this case, the adjacent area may be on the inside of an area where the test recording has been carried out in the predetermined area.

Alternatively, on the optical disc, a light spot may move in the direction from the outer periphery to the inner periphery of the optical disc, and the predetermined area may be used from the inner part to carry out the test recording. In this case the adjacent area may be on the outside of an area where the test recording has been carried out in the predetermined area.

In the recording power determining method, the predetermined data may be recorded with the determined recording power to areas inside and outside of a part area of the predetermined area in which test recording has been just carried out.

In the second aspect of the invention, provided is a method of determining a recording power used to record information to an optical disc. The method includes carrying out test recording which records a predetermined data to a predetermined test recording area to determine the recording power while a light spot moves in the direction from the inner periphery to the outer periphery and the predetermined test recording area is used from the outer part, and updating the recording power used for the test recording for each predetermined area from the high power to the low power.

In the third aspect of the invention, provided is a method of determining a recording power used to record information to an optical disc. The method includes carrying out test recording which records a predetermined data to a predetermined test recording area to determine the recording power while a light spot moves in the direction from the inner periphery to the outer periphery and the predetermined test recording area is used from the inner part, and updating the recording power used for the test recording for each predetermined area from the low power to the high power.

In the fourth aspect of the invention, provided is a method of determining a recording power used to record information to an optical disc. The method includes carrying out test recording which records a predetermined data to a predetermined test recording area to determine the recording power while a light spot moves in the direction from the outer periphery to the inner periphery and the predetermined test recording area is used from the outer part, and updating the recording power used for the test recording for each predetermined area from the low power to the high power.

In the fifth aspect of the invention, provided is a method of determining a recording power used to record information to an optical disc. The method includes carrying out test recording which records a predetermined data to a predetermined test recording area to determine the recording power while a light spot moves in the direction from the outer periphery to the inner periphery and the predetermined test recording area is used from the inner part, and updating the recording power used for the test recording for each predetermined area from the high power to the low power.

In the sixth aspect of the invention, provided is a method of determining a recording power used to record information to an optical disc. The method includes carrying out test recording which records predetermined data to a predetermined area of the optical disc to determine the recording power, and when the recording is interrupted during the test recording to the predetermined area, resuming recording with a predetermined power the data to the predetermined area in which the recording is interrupted.

In the above recording power determining methods, the optical disc may be of the write-once type.

In the seventh aspect of the invention, provided is an apparatus for recording information to an optical disc. The apparatus includes a power determining section that determines a recording power by carrying out test recording which records predetermined data to a predetermined area of the optical disc, and a recording section that records predetermined data with a power equal to or more than the determined recording power to an area adjacent to the predetermined area.

In the eighth aspect of the invention, provided is an apparatus for recording information to an optical disc. The apparatus includes a test recording section that carries out test recording to record a predetermined data to a predetermined test recording area for determining the recording power while a light spot moves in the direction from the inner periphery to the outer periphery and the predetermined test recording area is used from the outer part, and an update section that updates the recording power used for the test recording for each predetermined area from the high power to the low power.

In the ninth aspect of the invention, provided is an apparatus for recording information to an optical disc. The apparatus includes a test recording section that carries out test recording to record a predetermined data to a predetermined test recording area for determining the recording power while a light spot moves in the direction from the inner periphery to the outer periphery and the predetermined test recording area is used from the inner part, and an update section that updates the recording power used for the test recording for each predetermined area from the low power to the high power.

In the tenth aspect of the invention, provided is an apparatus for recording information to an optical disc. The apparatus includes a test recording section that carries out test recording to record a predetermined data to a predetermined test recording area for determining the recording power while a light spot moves in the direction from the outer periphery to the inner periphery and the predetermined test recording area is used from the outer part, and an update section that updates the recording power used for the test recording for each predetermined area from the low power to the high power.

In the eleventh aspect of the invention, provided is an apparatus for recording information to an optical disc. The apparatus includes a test recording section that carries out test recording to record a predetermined data to a predetermined test recording area for determining the recording power while a light spot moves in the direction from the outer periphery to the inner periphery and the predetermined test recording area is used from the inner part, and an update section that updates the recording power used for the test recording for each predetermined area from the high power to the low power.

In the twelfth aspect of the invention, provided is an apparatus for recording information to an optical disc. The apparatus includes a test recording section that carries out test recording which records predetermined data to a predetermined area of the optical disc to determine the recording power, and a resume section that, when the recording is interrupted during the test recording in the predetermined area, resumes recording with a predetermined power the data to the predetermined area in which the recording is interrupted.

BRIEF DESCRIPTION OF THE DRAWINGS

These and other object and features of the present invention will become clear from the following description taken in conjunction with the preferred embodiments thereof with reference to the accompanying drawings, in which:

FIG. 4A shows each sector of test recording area; FIG. 4B shows the output signal of the recording section; FIG. 4C shows the recording power for test recording in each sector; FIG. 4D shows a kind of marks recorded in each sector; FIG. 4E shows the output signal of the reproducing section; FIG. 4F shows asymmetry values; FIG. 4G shows 3T continuous signals; FIG. 4H shows 3T continuous signals with pulse width modulated; FIG. 4I shows 11T continuous signals; FIG. 4J shows 11T continuous signal with pulse width modulated;

FIG. 10 is a table showing various modes in the light spot moving direction and the direction of using test recording area in an optical disc;

FIG. 18 is a table showing various modes in the light spot moving direction and the use direction of test recording area in a multilayer optical disc;

FIGS. 22A and 22B are diagrams explaining other mode in the light spot moving direction and the direction of using test recording area on first and second recording layers of a multilayer optical disc, respectively;

DETAILED DESCRIPTION OF THE PREFERRED EMBODIMENTS

Referring to the accompanied drawings, preferred embodiments of the optical disc apparatus according to the present invention will be described in detail hereinafter.

<1. Configuration of the Optical Disc Apparatus>

Figure 1:
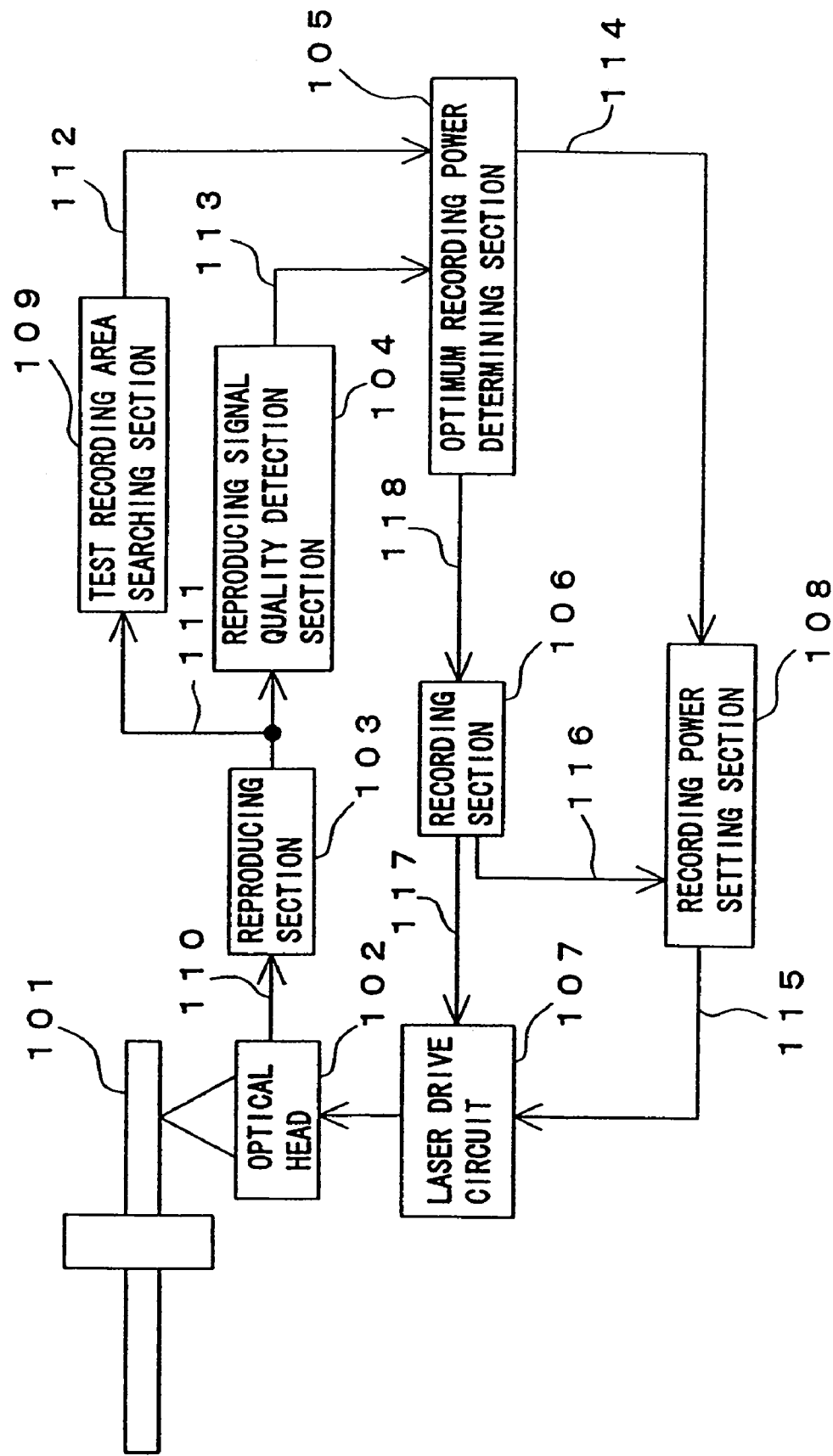
FIG. 1 is a block diagram of an optical disc apparatus according to the present invention.

FIG. 1 shows the configuration of the optical disc apparatus in one embodiment according to the present invention. In FIG. 1, the optical disc apparatus is an apparatus for recording information to an optical disc 101, and includes an optical head 102, reproducing section 103, reproducing signal quality detection section 104, optimum recording power determining section 105, recording section 106, laser drive circuit 107, recording power setting section 108 and test recording area searching section 109. The optical disc 101 referred to here is a write-once optical disc which can record information only once to the same place.

<2. Data Structure of Optical Disc>

Figure 2:
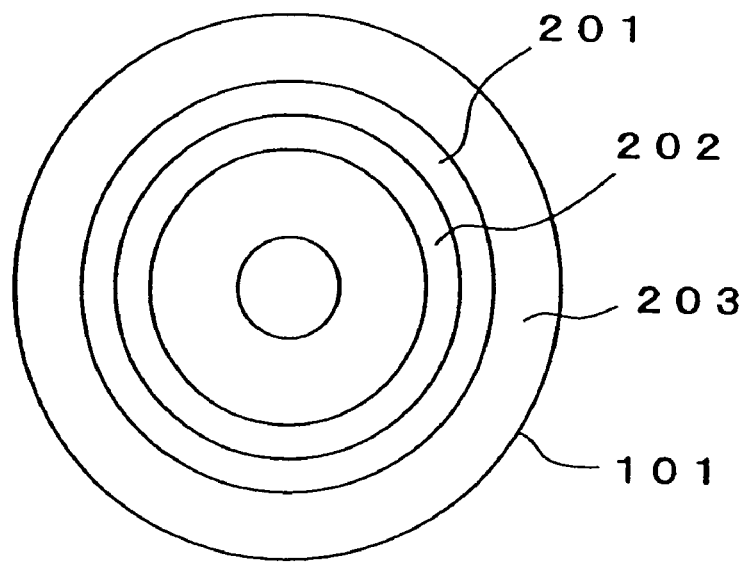
FIG. 2 is a diagram showing areas logically provided on the optical disc.

FIG. 2 is a diagram showing areas logically formed on the optical disc 101 in the present embodiment. As shown in FIG. 2, the optical disc 101 includes a control area 201 with disc type, etc. recorded, a test recording area 202 for determining a recording power (optimum recording power) most suited for recording the data, and a data area 203. Now, at least the test recording area 202 and the data area 203 are configured so as to have groove-form tracks which are connected in a spiral form and on which the information is recorded. It is noted that the track is formed by units called block, sector and frame, in which one sector is formed with a plurality of frames and one block is formed with a plurality of sectors.

The block is a recording unit to which error correction is applied, and at least in the data area 203, recording operation is performed in units of blocks. According to the present embodiment, in the test recording area 202, test recording is carried out with a plurality of recording powers, updating the recording power at each sector. However, the timing of updating the recording power is not limited to this, it may be at each block or each frame.

In the control area 201, the initial information may be recorded with concavo-convex pits. Alternatively, it may be recorded with the optical means same as that for recording the information in the data area 203 before shipment from the plant, when the control area is formed with a groove-form track as in the case of the data area 203.

Though in the present embodiment the test recording area 202 is located inside the control area 201, the location of the test recording area 202 is not limited to this, but for example, may be arranged adjacent to the data area 203.

Considering the warpage of the disc, the shorter the distance between the test recording area 202 and the data area 203, the closer is the degree of warpage, and it is possible to find the recording power more accurately. For example, if there is warpage in the test recording area 202 and there is no warpage in the data area 203, the irradiation beam is not applied vertically in the test recording area 202, and therefore additional irradiation power is required compared to when the beam is applied vertically. The recording power determined under such condition becomes overpower in the data area 203, thereby preventing the data from being correctly recorded.

<3. Operations of the Optical Disc Apparatus>

(Operations for Determining the Optimum Recording Power)

The description will be made on the operations when the optimum recording power of the optical disc apparatus is determined.

When the optical disc 101 is loaded to the optical disc apparatus and predetermined operations such as identification of disc type, rotation control, and so on are completed, the optical head 102 moves to the test recording area 202 for setting the optimum recording power. The optimum recording power may be set not only when the disc is loaded. For example, it may also be set when the temperature of the optical disc apparatus becomes out of the predetermined temperature range while the temperature is monitored.

When the optical head 102 arrives at the test recording area 202 and begins reproduction, the signal 111 which varies in accordance with presence of recording mark is entered into the test recording area searching section 109. It is noted that the signal 111 is sum of components of all the reflection signals from the optical disc 101, and since the reflection light quantity lowers at the recording pit section, the intensity of the signal 111 lowers.

The test recording area searching section 109 detects the unused area to which the test recording is performed. That is, the test recording area searching section 109 judges whether the reproduction area is an unused area according to the signal 111. Specifically, the test recording area searching section 109 judges whether the signal 111 achieves a level exceeding the predetermined signal level in a predetermined range of area or more or in a predetermined amount of time or more. The judgment result is outputted to the optimum recording power determining section 105 as the signal 112.

When the searching section 109 cannot find the unused area on which the test recording is carried out, the test recording area searching section jumps to a track which is apart by the predetermined quantity and carries out the same process there.

Figure 3:
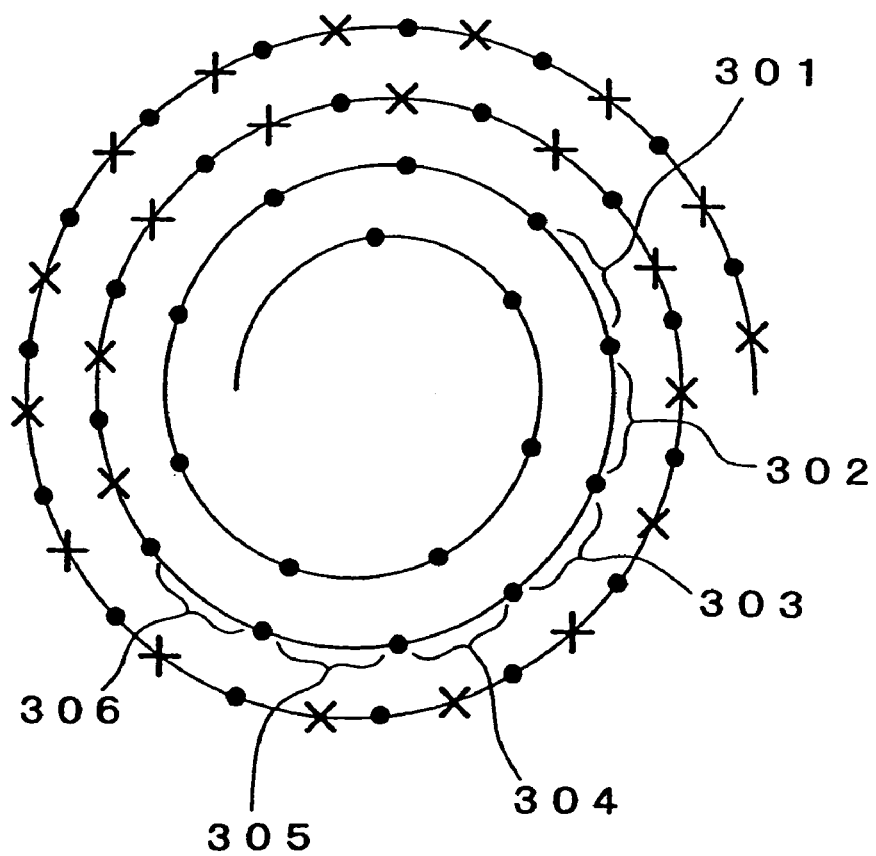
FIG. 3 is a diagram showing the test recording area and the recording status of each sector in the area.

FIG. 3 is a diagram schematically showing the test recording area 202 and shows the recording status of each sector in the test recording area. In FIG. 3, a sector marked with "X" indicates a used or recorded sector. In the present embodiment, the light spot moves in the direction from the inner periphery to the outer periphery and the test recording area is used from the area on the outer peripheral side.

Here, using the test recording area from the outer peripheral side means that, for example, in case that three tracks are used in the operation for determining one optimum power, when the second optimum recording power is determined after the first optimum recording power is determined, three tracks further inside from the three tracks which are used at the first determination are used at the second determination.

The more quickly the area that can be test-recorded is found, the more quickly the recording power can be determined, and processing can be transferred to data recording quickly. Accordingly, it is preferable to sequentially use the area from the inner peripheral side or from the outer peripheral side of the test recording area 202 as in the case of the present embodiment rather than randomly using the test recording area 202. Further, it is more suitable to continuously record so as not to leave an unused area between the used areas.

In the present embodiment, the test recording area 202 is used from a part of an area on the outer peripheral side which is closer to the data area 203. This is because the optimum power can be determined more accurately since in the outer peripheral side the disc warpage conditions and forming conditions of recording films are closer to the conditions of the data area 203 than on the inner peripheral side.

In the present embodiment, the test recording area 202 is located on the inner peripheral side of the control area 201, but it may be located on the outer peripheral side. By setting the test recording area 202 at the position closer to the data area 203, the warpage conditions and forming conditions of recording film of the disc in the test recording area 202 are brought closer to the conditions in the data area 203, enabling more accurate determination of the optimum power.

That is, when test recording is carried out on random areas, even if sufficient amount of unused areas are left, the test recording area searching section 109 must examine the quantities of unused area each time, and therefore it requires much time before undertaking the test recording. On the contrary, when test recording is done over successive area from inner or outer side, it is enough for the searching section only to find the border area between the used area and the unused area, and this enables the area for test recording to be searched in a short time. In addition, in the test recording with random areas, leaving the unused areas of amount insufficient for determining the optimum recording power may reduce the frequency for finding the optimum recording power.

FIGS. 4A to 4J are diagrams for explaining the test recording procedure. FIG. 4A shows each sector 301, 302, . . . of the test recording area 202. The sector 307 marked with "X" is the used sector and sectors (not illustrated) after the sector 307 are used sectors. In addition, the sectors before sector 301 are unused and a series of test recording should be performed in the direction of ascending order of sector number. In the following, a case in which sectors before sector 306 are judged unused and test recording begins with sector 303 will be described. FIG. 4B shows signal 116 outputted from the recording section 106. FIG. 4C shows the recording power value set in correspondence to each sector of FIG. 4A. FIG. 4D shows the kind of marks recorded in each sector.

When the area for carrying out test recording is detected by the test recording area searching section 109, test recording is carried out with recording power varied for each sector. A plurality of recording power levels are set in the recording power setting section 108 in advance. The setting of the recording power is updated sequentially based on the signal 116 outputted from the recording section 106. In the present embodiment, four levels of recording power are used in one test recording operation. At the recording power setting section 108, four power levels of 10 mW, 11 mW, 12 mW, and 13 mW are set as initial values (see FIG. 4C).

The initial values of the recording power may be stored beforehand in a memory other than the recording power setting 108 (not illustrated). They may be set by calculations, etc. based on the recommended recording power of disc recorded in the control area 201 of the optical disc 101. Alternatively, if the optical disc 101 has been recorded before, the initial value of the recording power may be set by calculations, etc. based on the recording power at that recording. In addition, the number of recording power levels may be more than four.

The recording section 106 records the information by an optical head 102 with the determined recording power while outputting the signal 117 for recording to the predetermined sector.

Figure 5:
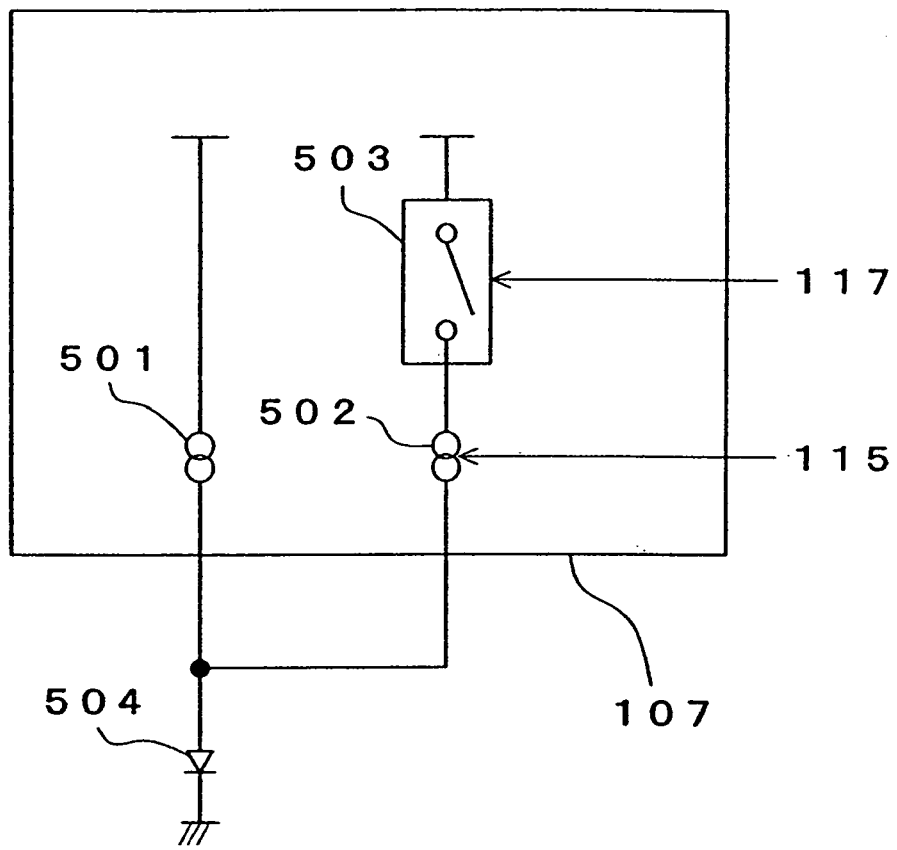
FIG. 5 is a block diagram of the laser drive circuit.

FIG. 5 shows one example of the laser drive circuit 107. The laser drive circuit 107 is equipped with a current source 501 used for reproduction, a current source 502 used for recording, and a switch 503. At the reproduction operation, the semiconductor laser 504 which is a component of the optical head 102 emits light by the reproducing power set at the current source 501. The amount of the current of the current source 502 at the recording is set by the signal 115. The switch 503 turns on when a High level signal is inputted and the sum of currents from the current source 501 and the current source 502 flows to the semiconductor laser 504. This enables the semiconductor laser 504 to emit light with the recording power set by the recording power setting section 108.

Next description will be made on the signal 117. In the present embodiment, for test recording, 3T continuous signal and 11T continuous signal are prepared in the recording section 106 (see FIG. 4D). The 3T continuous signal is a signal for recording the 3T pit section with 3T intervals, that is, recording a pit of 3T long at every interval of 6T, where T denotes the reference frequency (see FIG. 4G). The signal shown in FIG. 4G is modulated with the pulse width, etc. in the recording section 106 to be a signal shown in FIG. 4H.

Similarly, the 11T continuous signal is a signal for recording a pit 11T long at intervals of 22T (see FIG. 4I). The signal shown in FIG. 4I is made into multi-pulse or adjusted with each pulse width to become a signal shown in FIG. 4J. Now, the signal shown in FIG. 4H and signal 409 shown in FIG. 4J become the signal 117 to be inputed into the laser drive circuit 107. By the foregoing configuration, continuous pits 3T long and the following continuous pits 11T long are formed for every sector.

Upon completion of the recording, the semiconductor laser 504 which is the component of the optical head 102 emits light by the reproducing power and reproduces the track which has been just recorded, and the signal 110 which varies in accordance with a presence of recording mark on the optical disc 101 is inputted into the reproducing section 103 as a reproducing signal. The reproducing signal 110 undergoes reproducing signal process such as amplification, etc. at the reproducing section 103 and the signal 111 is inputted to the reproducing signal quality detection section 104.

Now, one example of signal 111 is shown in FIG. 4 E. FIG. 4E schematically shows the upper limit level and the lower limit level of each signal at each recording power. The upper limit level depends on the reflectance of the unused area between pits, while the lower limit level depends on the reflectance of the pit area. The greater the pit, the greater is occupation of the pit in the spot of the light beam and the lower is the reflectance. As shown in FIG. 4E, regarding the 11T signal, both upper limit level and lower limit level do not significantly depend on the size of the recording power excessively, and regarding the 3T signal, as the recording power increases, both upper limit level and lower limit level lower.

The reproducing signal quality detection section 104 detects the signal quality of signal 111 and the detection results are inputted in the optimum recording power determining section 105 as the signal 113. In the present embodiment, for the reproducing signal quality, the "asymmetry values" of 3T signal and 11T signal are detected and outputted to the optimum recording power determining section 105.

Figure 6:
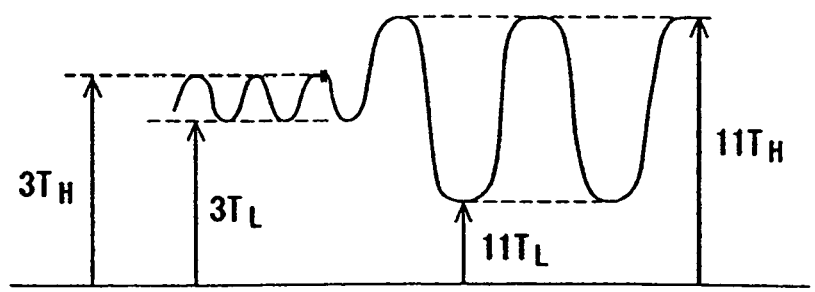
FIG. 6 is a diagram explaining the asymmetry detection method.

Referring now to FIG. 6, the detection method of the asymmetry value will be described hereinafter. FIG. 6 is an enlarged view of 3T signal and 11T signal of the signal 111. The asymmetry value A can be calculated from the following formula:

$$A=\{(3T_H+3T_L)/2-(11T_H+11T_L)/2)\}/(11T_H-11T_L)$$

where, $3T_H$ is the upper limit of the 3T signal and $3T_L$ is the lower limit of the 3T signal. $11T_H$ is the upper limit of the 11T signal and $11T_L$ is the lower limit of the 11T signal.

FIG. 4F plots asymmetry values at each recording power. The sign is reversed depending on whether the average level of 3T signal is above or below the average level of 11T signal. The optimum recording power determining section 105 determines, as the optimum recording power, the average of recording power before and after the sign of asymmetry reverses. Here, the power before and after the sign reverses 11 mW and 12 mW, respectively, and therefore the optimum recording power is determined as 11.5 mW which is the average of the power before and after the sign reverses.

In the present embodiment, in the reproducing signal quality detection section 104, the asymmetry value is detected, however error rate, jitter and so on may be detected. The optimum recording power determining section 105 can determine the recording power, as the optimum recording power, so that, for example, error rate or jitter becomes minimum.

Now, the error rate is the value obtained by comparing the recorded original signal with the reproduced signal and finding the error rate, and under the same reproduction conditions in general, the smaller error rate can provide more accurate recording. In addition, jitter is a time lag between the reproducing signal and the original signal, and in general, the smaller jitter can provide more accurate recording.

Figure 12:
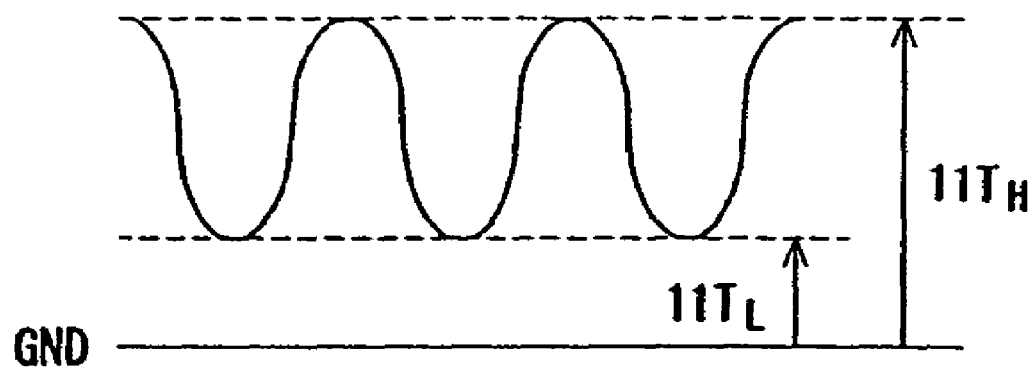
FIG. 12 is a diagram explaining the modulation degree detected at the reproducing signal quality inspection section.

The reproducing signal quality detection section 104 may detect the modulation factor. The modulation factor can be expressed by the following equation when the recording signal is the 11T continuous signal as shown in FIG. 12. It is noted that the recording signal may be the signal connecting the 3T continuous signal to the 11T continuous signal, or may be the random signal.

$$\text{Modulation Factor}=(11T_H-11T_L)/11T_H$$

The reproducing signal quality detection section 104 may detect the above-mentioned physical quantities in combination. The section 104 may determine the final optimum recording power, by test recording with the power just above and below the reference power which is obtained from the detection of the asymmetry value and then detecting, for example, the jitter. Combination of the above-mentioned physical quantities enables the more accurate determination of the optimum recording power.

(Recording to the Adjacent Area of the Test-recorded Area After Determination of the Optimum Recording Power)

When the optimum recording power is determined, to the sector 302 adjacent to sectors 303, 304, . . . used for test recording, signals are recorded with the determined optimum recording power. Signals recorded in this operation may be signals connecting 3T continuous signal to 11T continuous signal same as those recorded in sectors 303, 304, 305, 306, or may be random signals.

Recording signals with the optimum recording power to the sector adjacent to the sector to which test recording has been just performed can provide the following advantage. That is, even when the unused area detection section 109 has a possibility to erroneously judge that sectors 303 and 304 are unused areas at the next test recording due to, for example, insufficient recording power to sectors 303 and 304, it is possible to judge that sector 302 and the following sectors (that is, sectors 303, 304, . . . ) are used areas or recorded areas by reproducing the sector 302 since the sector 302 is recorded with the optimum recording power.

It is noted that though in the present embodiment, in the sector 302, recording is carried out with the optimum recording power, the recording may be carried out with the power greater than the optimum recording power.

In addition, in the present embodiment, though the recording with the optimum recording power is carried out only to the sector 302, the recording with the optimum recording power may be carried out to the sectors in vicinity of the sector 302 together with the sector 302. As the area recorded at the optimum recording power increases, it is possible to more securely search the border between the unused area and the used area at the next test recording. In particular, when the random signals is used as the recording signal for test recording, the synchronous signal of the reproducing signal can be extracted more securely and the error rate can be detected more accurately.

In the present embodiment, recording with the optimum recording power is carried out to the sector in the inner peripheral of the area where test recording is carried out, but the recording with the optimum recording power may be carried out in the outer periphery of the area where test recording is carried out after the optimum recording power is determined. For example, referring to FIG. 3, after determining the optimum recording power using sectors 302 through 305, recording with the optimum recording power may be carried out to sectors 301 and 306 on the inner and outer peripheries of the areas of those sectors, respectively. This can prohibit misjudgement in the following case. That is, for example, when test recording is performed while varying the power from the high power, the low recording power continues in the latter half of the test recording area and therefore there is a possibility to misjudge at the next test recording that the latter half of the test recording area is unused. This problem can be solved by recording with the optimum recording power to the sectors on both sides of sectors to which test recording is performed.

After recording with the optimum recording power to a sector, the test recording area searching section 109 may confirm or verify that the recorded sector can be judged recorded or used by reproducing the recorded sector. If the sector is unable to be judged as having been used because the sector 302 is stained, for example, by grime due to fingerprints and so on, recording with the optimum recording power is carried out again to the sector 301. Verifying in this way the success of recording after the test recording by the test recording area searching section 109 enables the border between the unused area and the used area to be searched more accurately at the test recording in the next trail.

In the present embodiment, recording with the optimum recording power is carried out to the sector 302 that is adjacent to sectors 303, 304, 305 and 306 in which test recording was carried out. The recording with the optimum recording power however may be performed to other sectors. For example, when six sectors of sectors 301, 302, 303, 304, 305 and 306 form one block, the recording with the optimum recording power may be carried out to the sector which is at the predetermined order of each block, for example, at the first sector, 301. By recording the information with the optimum recording power to the sector with the predetermined order of each block, it is possible to quickly judge whether a block has been recorded only by examining the presence of record in the sector of the predetermined order of the block.

Similarly, when the predetermined phase of the disc can be detected, recording with the optimum recording power may be carried out to the sector with the predetermined phase in each track. For example, for the optical disc which has an address area at an angle of every 45°, recording with the optimum recording power may be carried out to the sector just after the address area. Alternatively, for the optical disc having a spiral which is composed of a groove-form track connected every one cycle with a track between grooves, recording with the optimum recording power may be carried out to the sector just after the border between the groove-form track and the track between the grooves.

As described above, recording with the optimum recording power to a location which is detectable by features of address format or track format enables quick judgment on whether the adjacent predetermined areas have been recorded by examining the presence of the record at that position.

In the above-mentioned description, test recording is carried out in the spot moving direction while sequentially varying the power from the low recording power. The recording power may be varied by other methods, and test recording may be carried out by sequentially varying the power from the high recording power. Sequentially test-recording from the high recording power could minimally suppress the effect of the judgment error, for example, if the test recording area searching section 109 can judge that the sector 303 recorded with the high recording power is a recorded or used area even though it could not judge that the sector 302 recorded with the optimum recording power later than the sector 303 was recorded.

That is, the border between the unused area and the used area can be searched more accurately by updating the recording power from the high power side to the low power side, in case that test recording is carried out while the light spot moves in the direction from the inner periphery to the outer periphery, the test recording area is used from the outer periphery side, and recording power is updated for every predetermined range.

Figure 7:
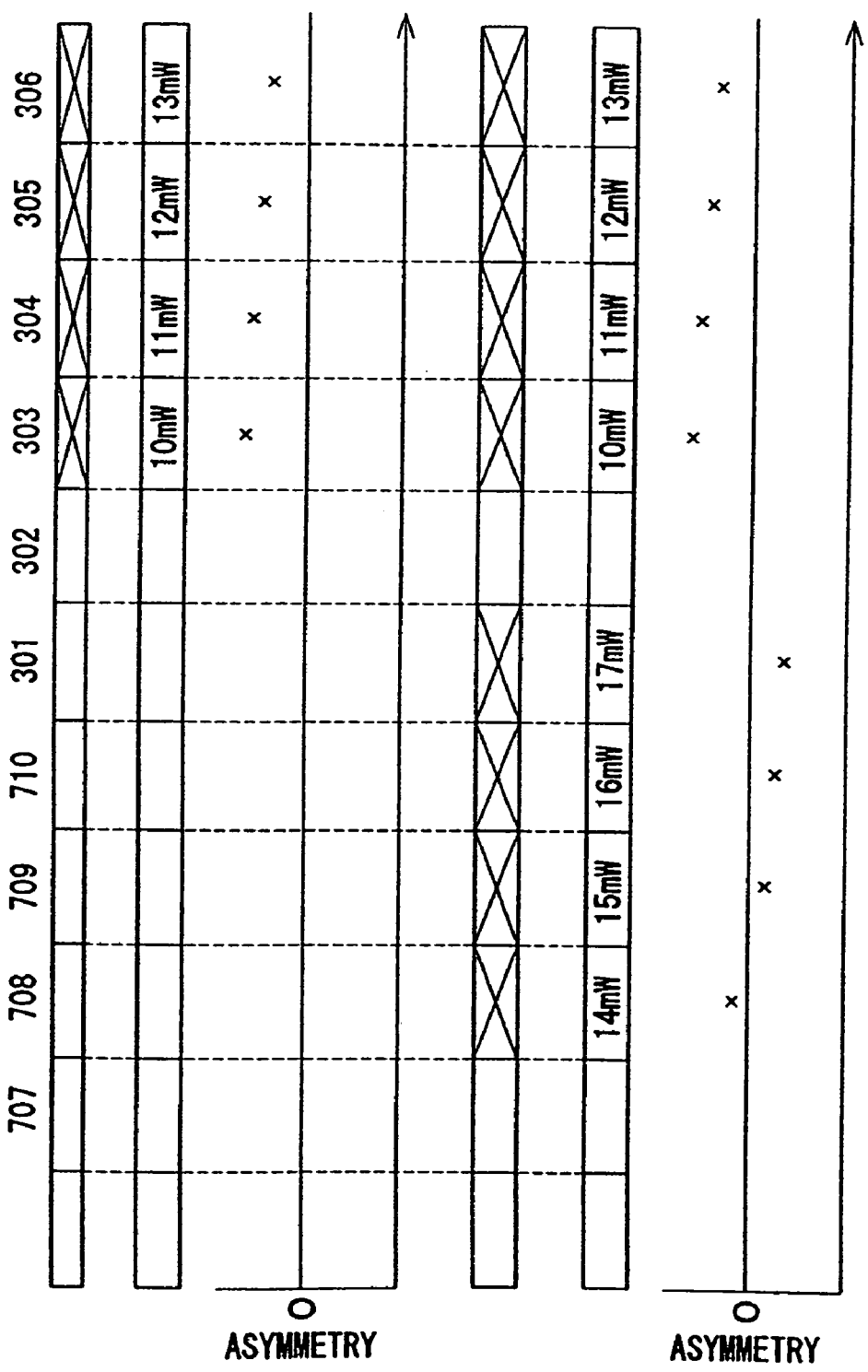
FIGS. 7A through 7C show sectors, recording power, and asymmetry values after the first test recording is carried out, respectively.
FIGS. 7D through 7F show sectors, recording power, and asymmetry values after the second test recording is carried out, respectively.

Referring to FIG. 7, description will be made on the process when the optimum recording power can not be determined even when the test recording is carried out as described above.

FIGS. 7A through 7C show the sector status, recording power, and asymmetry value, respectively, when the first test recording has been carried out. FIGS. 7D through 7F show the sector status, recording power, and asymmetry value, respectively, when the second test recording has been carried out. FIGS. 7A and 7D show the status of each sector of the test recording area 202, and the sector marked with "X" indicates the used sector. FIGS. 7B and 7E show the power for recording in each sector when test recording is carried out in each sector. In FIGS. 7C and 7F plotted are the asymmetry values when each sector with data recorded is reproduced.

Referring to FIGS. 7B and 7C, it is found that the power is insufficient in the first test recording. The causes may include warpage in the optical disc 101, the object lens which is the component of the light head 102 is stained, and so on. In such a situation, test recording is carried out on sectors 708, 709, 710, 301 with the power higher than the first time as shown in FIG. 7E, and the reproducing signal quality detection section 104 detects the asymmetry value, and the optimum recording power determining section 105 examines whether the recording power that reverses the sign of the asymmetry value is detected. As shown in FIGS. 7E and 7F, the power before and after the reverse of the sign is 14 mW and 15 mW, respectively, and the optimum recording power determining section 105 determines 14.5 mW as an optimum recording power, which is the average of both recording powers. If the optimum power is unable to be determined even in the second time, the third time and after will be carried out in the same way.

In the present embodiment, test recording is carried out to sectors 708, 709, 710 and 301 with the power higher than the first time, but part of the power range of the first time and the second time may be overlapped. Generally, the asymmetry values of the similar level can be detected in the sectors in which test recording is carried out with the power of the similar level in the first time and in the second time. It is therefore possible to detect the asymmetry value with higher reliability with dispersions taken into account, by comparing the two results.

Figure 8:
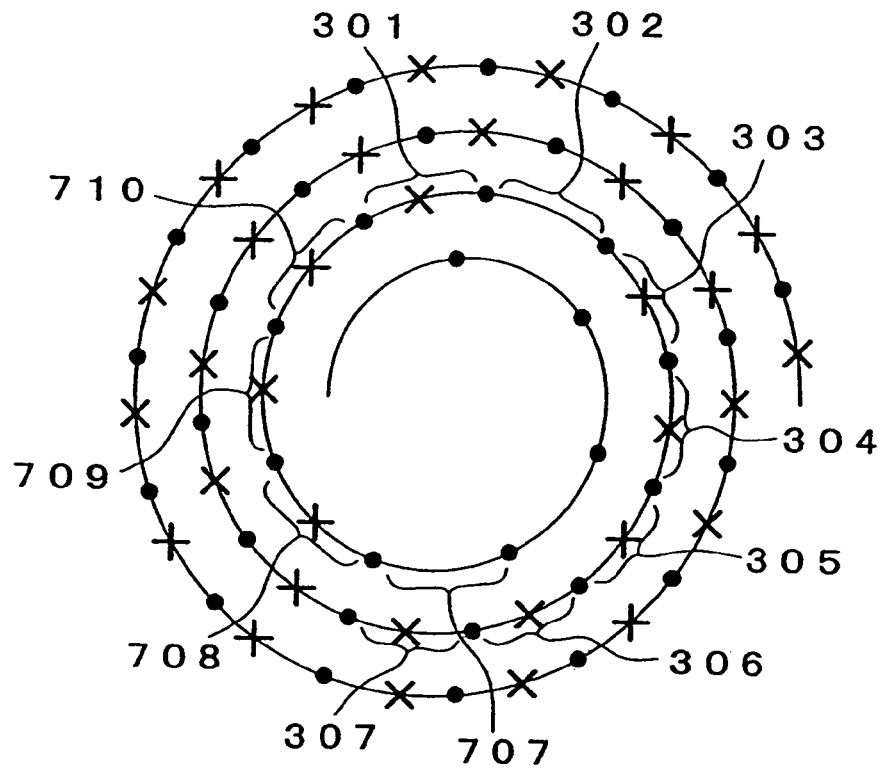
FIG. 8 is a diagram showing the recording status of sectors of the test recording area in the condition when the second test recording is finished.

FIG. 8 shows the recording status of each sector of the test recording area 202 when the second test recording is completed. In FIG. 8, sectors marked with "X" mean used sectors. When the optimum recording power is determined, recording is carried out with the optimum recording power to the sector 707 and sector 302. The signal recorded in such case may be the signal with 3T continuous signal connected to 11T continuous signal same as that recorded in sectors 708, 709, 710 and 301 or a random signal.

According to recording the signal to sector 707 with the optimum recording power, it is possible to judge that sectors 707 and after (sectors 708, 709, . . . ) are used areas by reproducing sector 707 even if the test recording area searching section 109 mistakenly judges these sectors 708 and 709 as unused sectors due to the insufficient recording power of sector 708 or sector 709 because the sector 707 is recorded with the optimum recording power.

Furthermore, by recording the signal to the sector 302 with he optimum recording power, even if the test recording area searching section 109 mistakenly judges the sector unused due to the insufficient recording power to sectors 303, 304, 305 and 306, it is possible to judge the areas as used areas by reproducing five consecutive sectors because the sector 302 is recorded with the optimum recording power.

Figure 9:
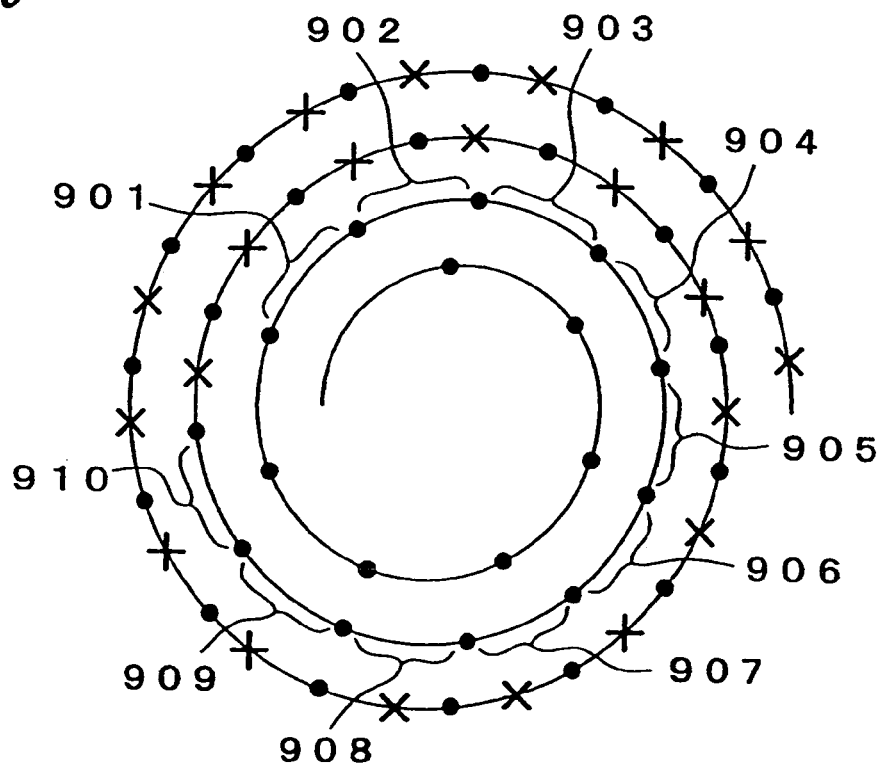
FIG. 9 is a diagram showing the recording condition of the test recording area.

For example, as shown in FIG. 9, when the first test recording is carried out to sectors 907, 908, 909 and 910 and the second test recording is carried out to sectors 903, 904, 905 and 906, there is a possibility of misjudgment on whether they are used by reproducing five consecutive sectors. It therefore needs to reproduce the sectors or more, and it takes additional time to detect the area in which test recording can be carried out. In this case, by carrying out the second test recording to sectors 902, 903, 904, 905 and test recording to sector 901 and sector 906 with the optimum recording power, it is possible to accurately judge the sectors used by reproducing five consecutive sectors. Thus, the time taken to search the test recording area.

By recording signals with the recording power determined by the test recording to the areas adjacent to the area for which test recording is carried out as described above, it is possible to prevent the used area from being mistakenly judged an unused area, that is, an area enabling test recording, and in addition it is possible to reduce the time required for searching the unused area.

In the foregoing description, the optimum recording power is determined with the recording power varied from high power to low power, while the light spot moves in the direction from inner periphery to outer periphery and the test recording area is used form the outer peripheral side. FIG. 10 shows another embodiment on the light spot moving direction and the direction of using the test recording area. It is noted that the case (A) in FIG. 10 corresponds to a mode for the embodiment described above.

FIGS. 13 through 16 schematically describe cases (A) through (D) shown in FIG. 10, respectively. In FIGS. 13 through 16, arrow marks are affixed to sectors recorded in the latest two power learnings and the number is assigned in order of recording. The thickness of the arrow mark indicates the size of the recording power except No. 5 and No. 10. That is, the thicker the arrow mark, the greater is the recording power.

Figure 13:
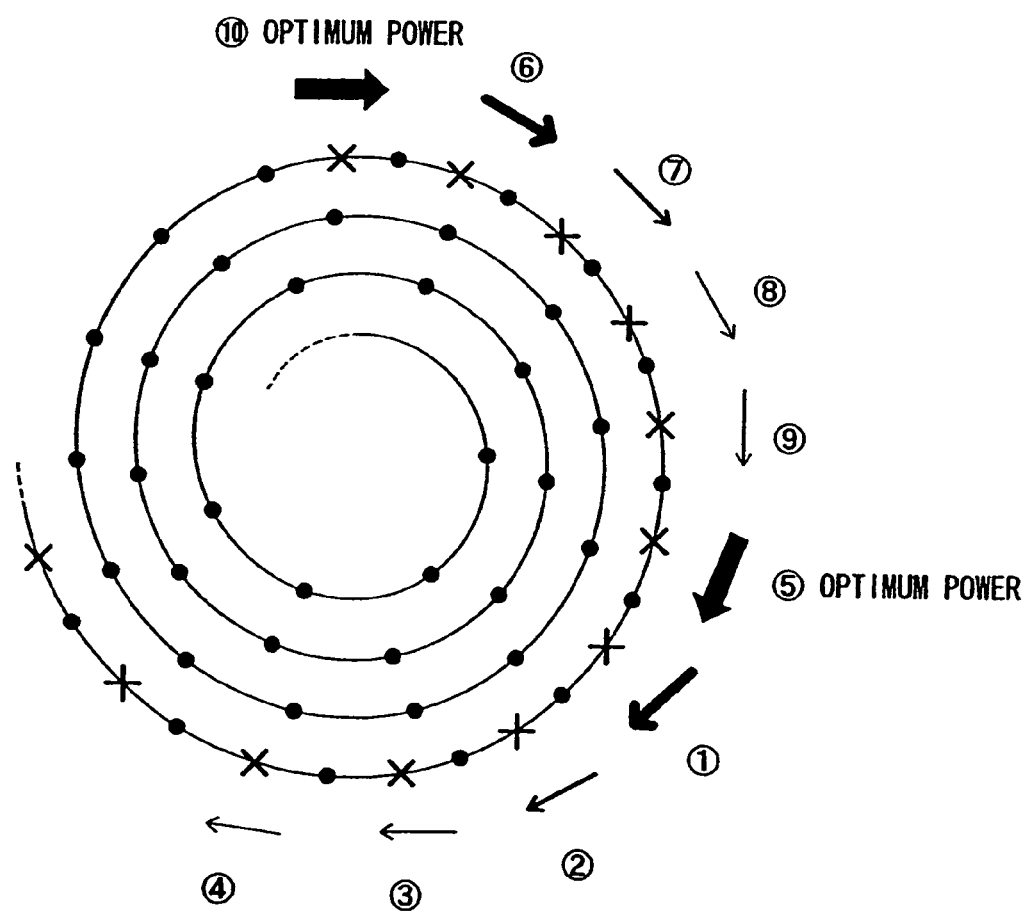
FIG. 13 is a diagram explaining one mode in the light spot moving direction and the use direction of test recording area in an optical disc.

In case (A), the recording power level is set so that the power is varied from high power to low power when the spot moves in the direction from inner periphery to outer periphery and the test recording area is used from the outer circumferential side (see FIG. 13). This enables the sector which is reproduced right after the light spot passes the border between the unused area and the used area to be recorded with high power, resulting in reduction of misjudgment as identifying the recorded sector as unrecorded sector.

In addition, as in the case (A), by taking the inner peripheral side of the test recording area for the area to be recorded with the optimum recording power while the spot moves in the direction from inner periphery to outer periphery and the test recording area is used from the outer peripheral side, recording with the optimum power is performed to the sector which is to be reproduced just after the light spot passes the border between the unused area and the used area. This can reduce a possibility of misjudgment of identifying the recorded sector as unrecorded sector.

Figure 14:
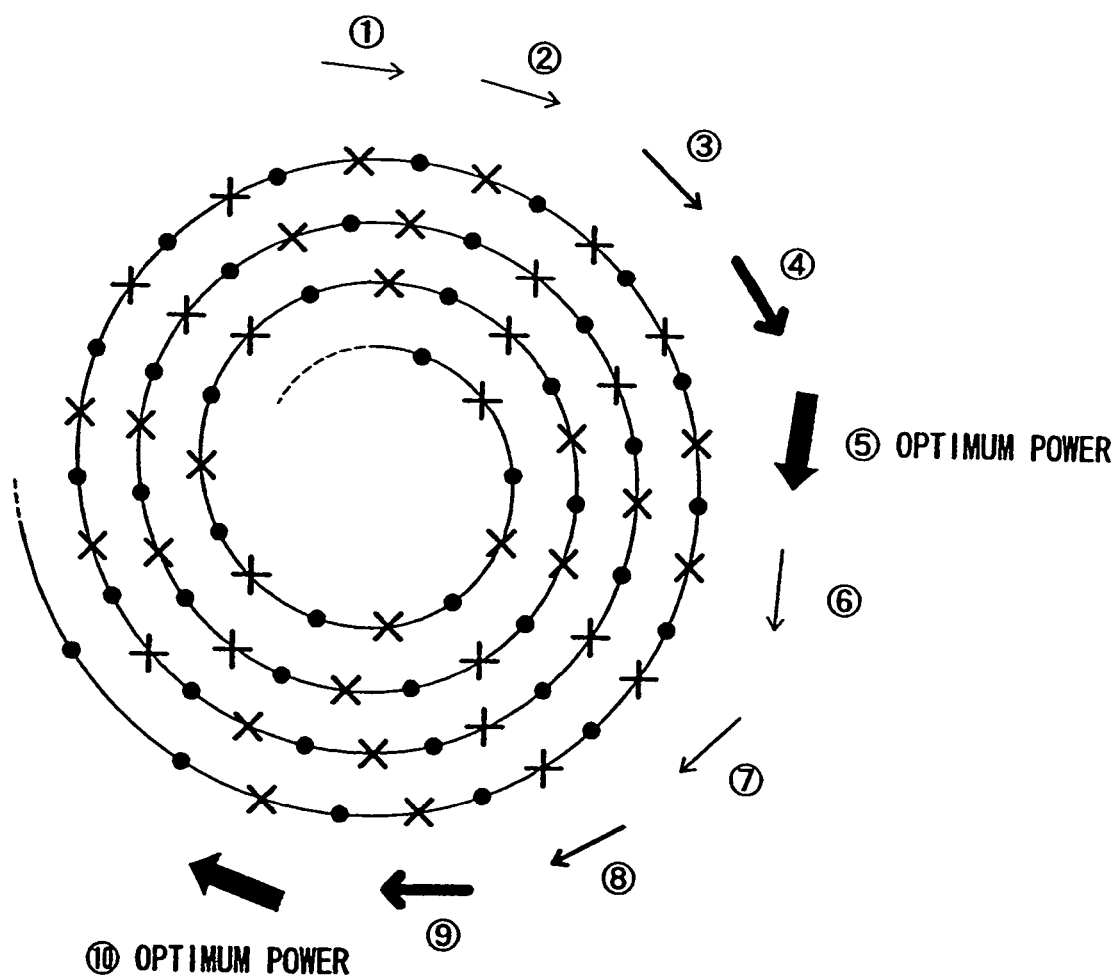
FIG. 14 is a diagram explaining another mode in the light spot moving direction and the direction of using test recording area in an optical disc.

In case (B), the recording power level is set so that the power is varied from low power to high power when the spot moves in the direction from inner periphery to outer periphery and the test recording area is used from the inner circumferential side (see FIG. 14). By this, the sector which is to be reproduced just after the light spot passes the border between the unused area and the used area is recorded with high power, and therefore a possibility of misjudgment of identifying the recorded sector as unrecorded sector can be reduced.

In addition, as in the case (B), by taking the inner peripheral side of the test recording area for the area to be recorded with the optimum recording power when the spot moves in the direction from inner periphery to outer periphery and the test recording area is used from the inner peripheral side, the sector which is to be reproduced just before the light spot passes the border between the unused area and the used area is recorded with the optimum recording power. Thus a possibility of misjudgment of identifying the recorded sector as unrecorded sector can be reduced.

Figure 15:
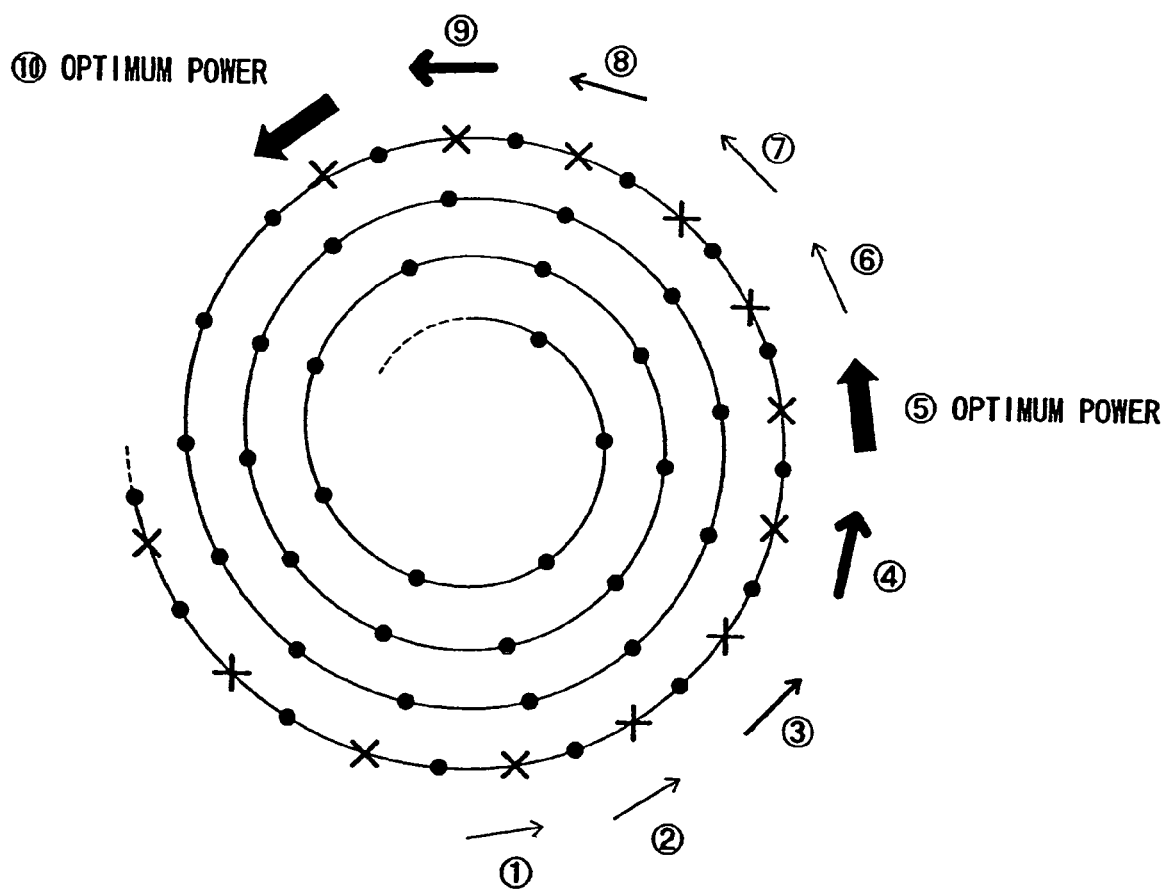
FIG. 15 is a diagram explaining the other mode in the light spot moving direction and the use direction of test recording area in an optical disc.

In case (C), the recording power is set so that the power is varied from low power to high power when the spot moves in the direction from outer periphery to inner periphery and the test recording area is used from the outer circumferential side (see FIG. 15). By this, the sector which is to be reproduced just before the light spot passes the border between the unused area and the used area, signals are recorded with high power, and therefore a possibility of misjudgment of identifying the recorded sector as unrecorded sector can be reduced.

In addition, as in the case (C), by taking the inner peripheral side of the test recording area for the area to be recorded with the optimum recording power when the spot travels in the direction from outer periphery to inner periphery and the test recording area is used from the outer peripheral side, the sector which is to be reproduced just before the light spot passes the border between the unused area and the used area is recorded with the optimum recording power, and therefore a possibility of misjudgment of identifying the recorded sector as unrecorded sector can be reduced.

Figure 16:
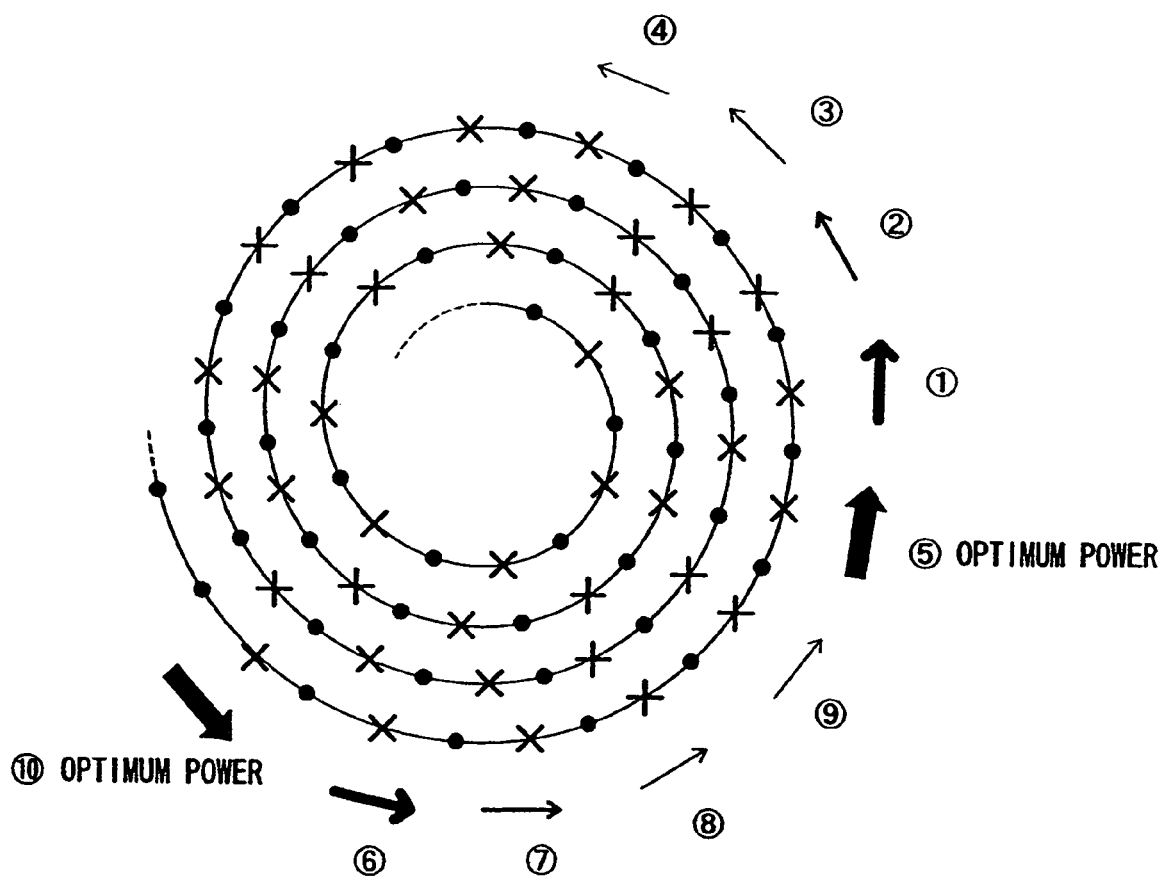
FIG. 16 is a diagram explaining the other mode in the light spot moving direction and the use direction of test recording area in an optical disc.

In case (D), the recording power is set so that the power is varied from high power to low power when the spot moves in the direction from outer periphery to inner periphery and the test recording area is used from the inner circumferential side (see FIG. 16). By this, the sector which is to be reproduced just after the light spot passes the border between the unused area and the used area is recorded with the optimum recording power, and therefore a possibility of misjudgment of identifying the recorded sector as unrecorded sector can be reduced.

In addition, as in the case (D), by taking the outer peripheral side of the test recording area for the area to be recorded with the optimum recording power when the spot moves in the direction from outer periphery to inner periphery and the test recording area is used from the inner peripheral side, the sector which is to be reproduced just after the light spot passes the border between the unused area and the used area is recorded with the optimum recording power, and therefore a possibility of misjudgment of identifying the recorded sector as unrecorded sector can be reduced.

In each mode shown in FIG. 10, both recording power and the position of the area recorded with the optimum recording power are specified in accordance with the light spot moving direction and the direction of using the test recording area, but the same effects as above can be obtained by specifying either one of them.

Figure 11:
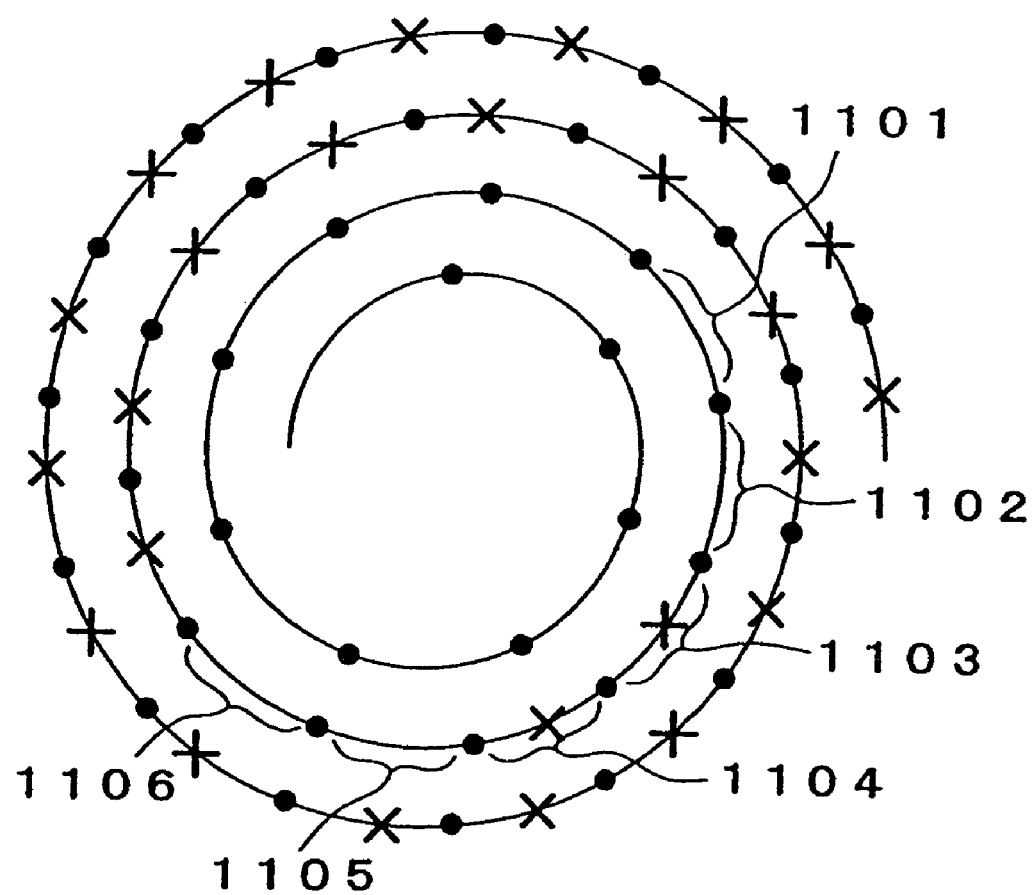
FIG. 11 is a diagram schematically showing the test recording areas on an optical disc.

Using FIG. 11, next description will be made on the process when recording is interrupted while test recording is being carried out. FIG. 11 schematically shows the test recording area 202 on the optical disc as well as the recording status of each sector. The sectors marked with "X" are used sectors. In the present embodiment, the spot moves in the direction from inner periphery to outer periphery, and test recording is carried out from the outer-peripheral side (corresponding to case (A)).

Referring now to FIG. 11, when recording is carried out in sectors 1103, 1104, 1105, 1106 in the first test recording, for example, the servo comes off due to disturbance and recording is made on two sectors only of sectors 1103 and 1104. In such a case, before doing over test recording again in sectors 1102, 1101, . . . further within the sector 1103, sectors 1105 and 1106 are recorded again with the predetermined recording power. The recording signals to the sectors 1105 and 1106 may be the same signals recorded in sectors 1103, 1104 or optional dummy data.

By re-recording to the area to which recording could not be carried out due to interruption when recording was interrupted during test recording to the predetermined area in this way, the recording area can be continued. Thus it is possible to prevent the area from falsely being judged recordable.

It is noted that in the present embodiment, the re-recording to the sector in which recording was unable to be carried out due to interruption of recording is carried out with the predetermined recording power, but this recording power should be, for example, the maximum power in the first recording. By using the maximum power, the unused area detection section 109 can judge more definitely that the area is the used area.

It is also possible to perform the second test recording to inner sectors 1102, 1101 when recording is interrupted and determine the optimum recording power, and then to perform the second test recording to sectors 1105 and 1106 in which recording could not be performed due to interruption in the first test recording with the optimum recording power. This allows the unused area detection section 109 to distinguish more definitely the unused area from the used area.

In the present embodiment, re-recording is done to sectors 1105 and 1106 in which recording was unable to be carried out due to interruption of recording, re-recording however may be done to sectors 1103, 1104, 1105 and 1106.

It is noted that, even when recording is interrupted in the middle of the sector and recording is done to a part of the sector, if it is possible to judge that the area is the used area when the recorded section of the sector is reproduced, it is not necessary to re-record in the remaining unused area of the sector for which recording was interrupted.

In the present embodiment, description was made on the write-once type optical disc, but the invention can be applied to the re-writable type optical disc, in which, for example, re-recording may be performed to the sector to which recording was unable to be carried out due to interruption of recording. In particular, when the recording performance of the first recording differs from that of the second recording and after, re-recording enables recording performance of the test recording area between the first and second recordings to be equal.

For the re-writable optical disc, recording with the power determined by the test recording to the area adjacent to the area to which test recording is performed can identify the border between the used area and the unused area in at least the first recording, and prevent test recording to the sector to which the first test recording and the second or later test recording has been performed, thus resulting in accurate determination of the optimum recording power.

Similarly, in the re-writable optical disc, it is possible to search the border between the unused area and the used area more definitely by updating the recording power level in test recording, for example, so that the power is varied from high power to low power, in case that the light spot moving direction is from inner periphery to outer periphery and the test recording area is used from the outer peripheral side, and the recording power is updated for each predetermined range. That is, at least in the first recording, it is possible to clarify the border between the used area and the unused area, and prevent test recording to the sector to which the first test recording and the second or later test recording has been performed, thus resulting in accurate determination of the optimum recording power.

(Application to Multi-Layer Optical Discs)

In the above-mentioned description, the method of determining the optimum recording power for a single-layer optical disc having only one recording layer is described. In the following, the case in which the method is applied to the multi-layer optical disc having a plurality of recording layers will be described.

Figure 17:
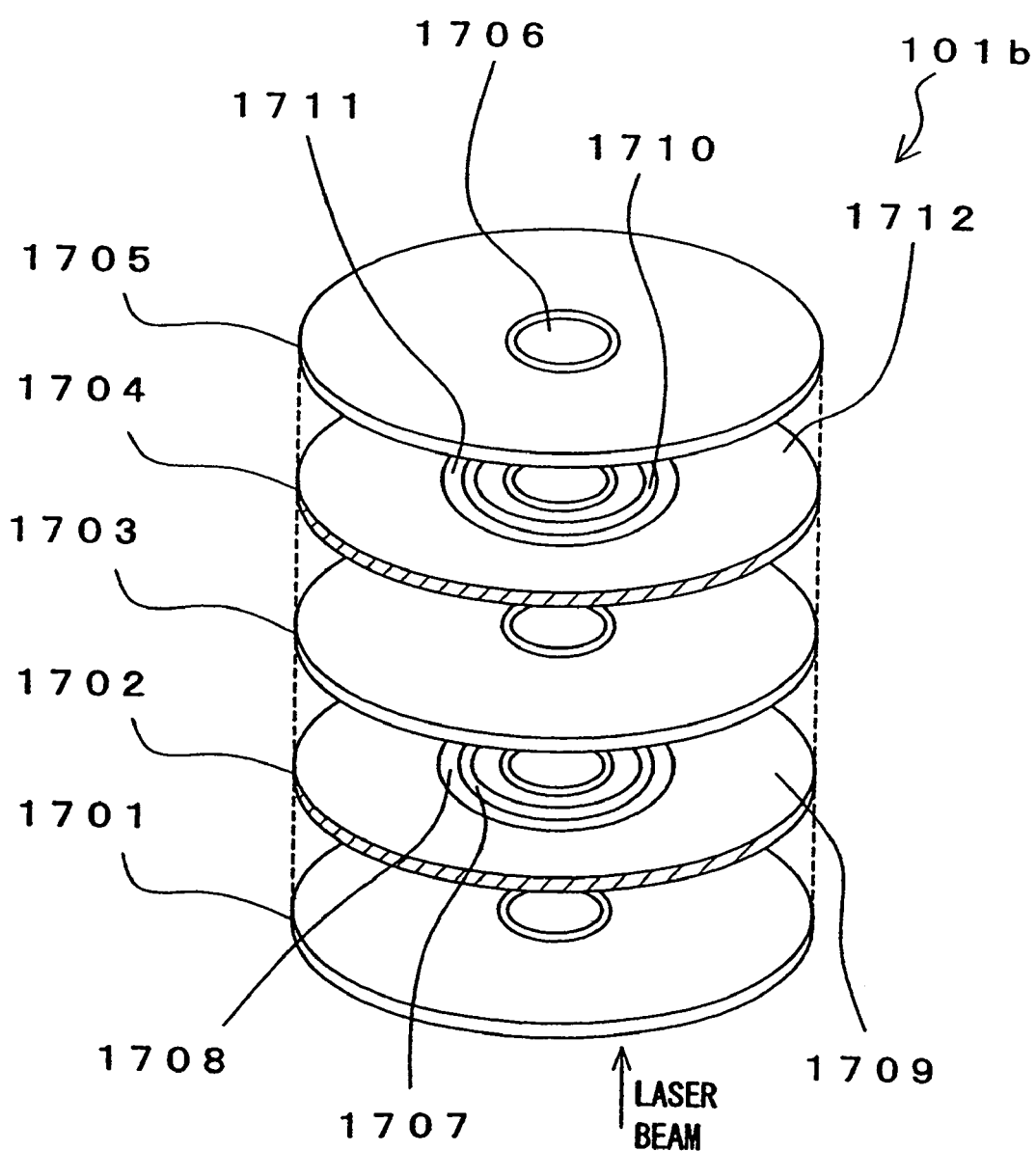
FIG. 17 is a diagram showing the configuration of a multilayer optical disc.

FIG. 17 is the diagram explaining each layer of the optical disc which has two layers of information recording surfaces each having the same reading light impinging surface, and areas formed on each layer. As shown in the drawing, the optical disc 101b includes the first substrate 1701, the first recording layer 1702, adhesive resin 1703, the second recording layer 1704, and the second substrate 1705. The optical disc 101b is provided with a clamp hole 1706. On the first recording layer 1702, test recording area 1707, control area 1708, and data area 1709 are formed. On the second recording layer 1704, test recording area 1710, control area 1711, and data area 1712 are formed.

The first substrate 1701 and the second substrate 1705 are provided to protect the first recording layer 1702 and the second recording layer 1704, respectively, and made of polycarbonate resin and so on. The control area 1708 of the first recording layer 1702 has a reproduction dedicated area in which the irradiation power information used for recording information on the first recording layer 1702 and so on are recorded. Similarly, the control area 1711 of the second recording layer 1704 has also a reproduction dedicated area in which the irradiation power information used for recording information on the second recording layer 1704 and so on are recorded.

Figure 19A:
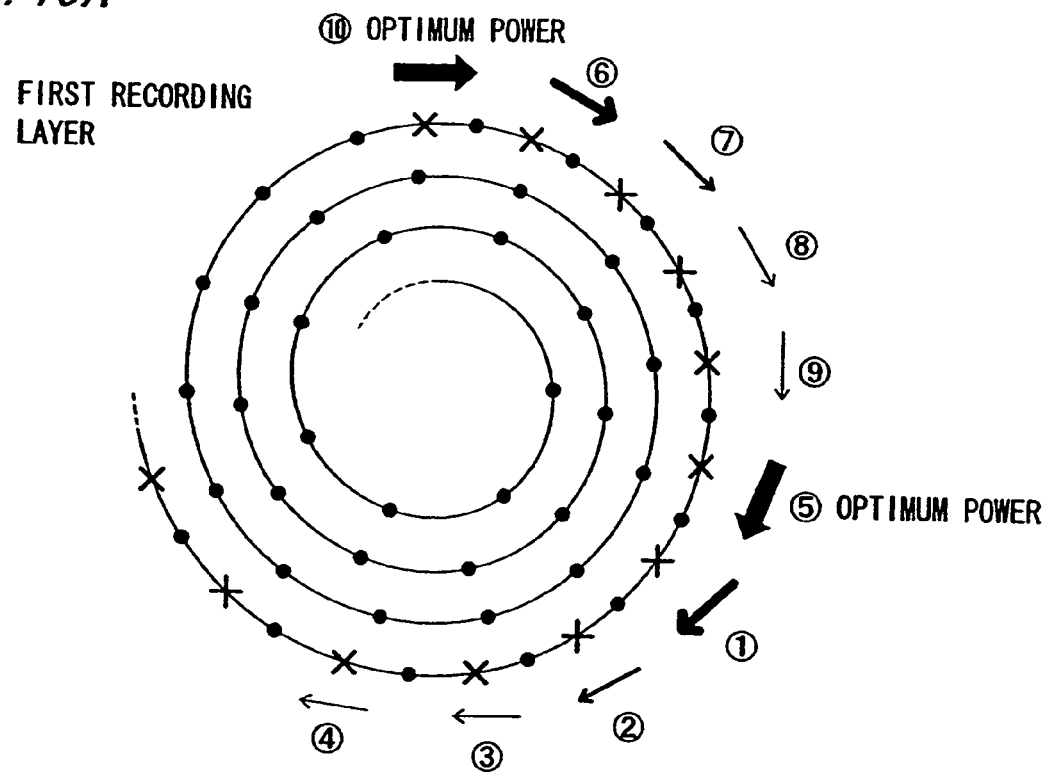
FIGS. 19A and 19B are diagrams explaining one mode in the light spot moving direction and the direction of using test recording area on first and second recording layers of a multilayer optical disc, respectively.
Figure 19B:
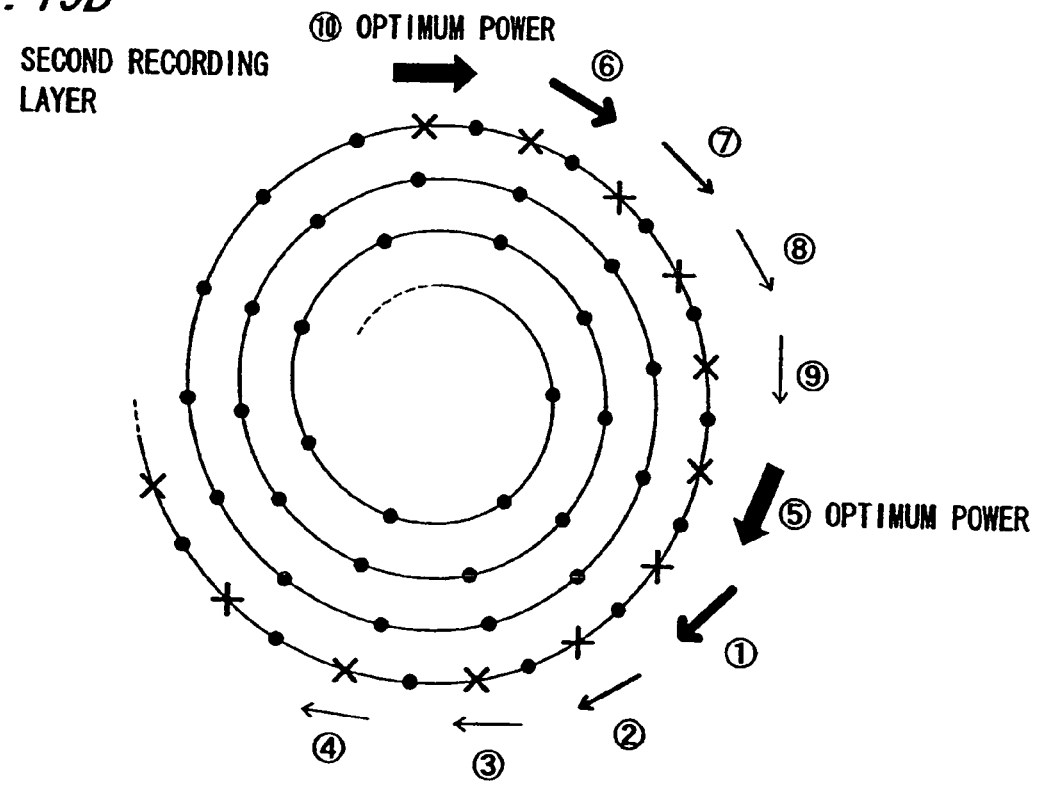
Figure 20A:
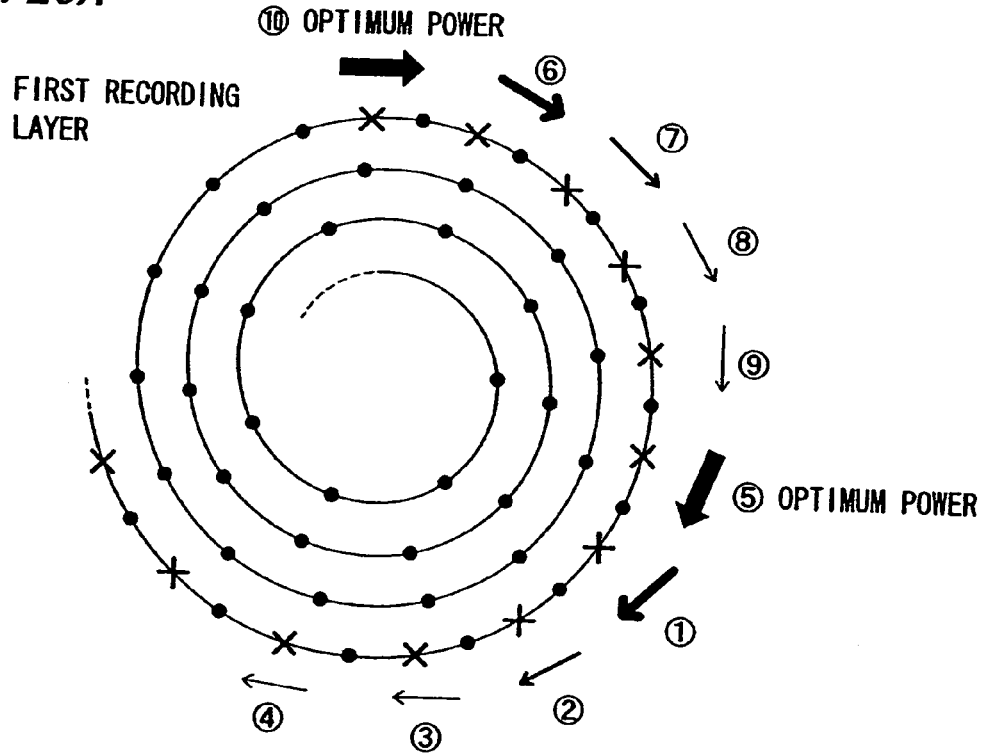
FIGS. 20A and 20B are diagrams explaining other mode in the light spot moving direction and the direction of using test recording area on first and second recording layers of a multilayer optical disc, respectively.
Figure 20B:
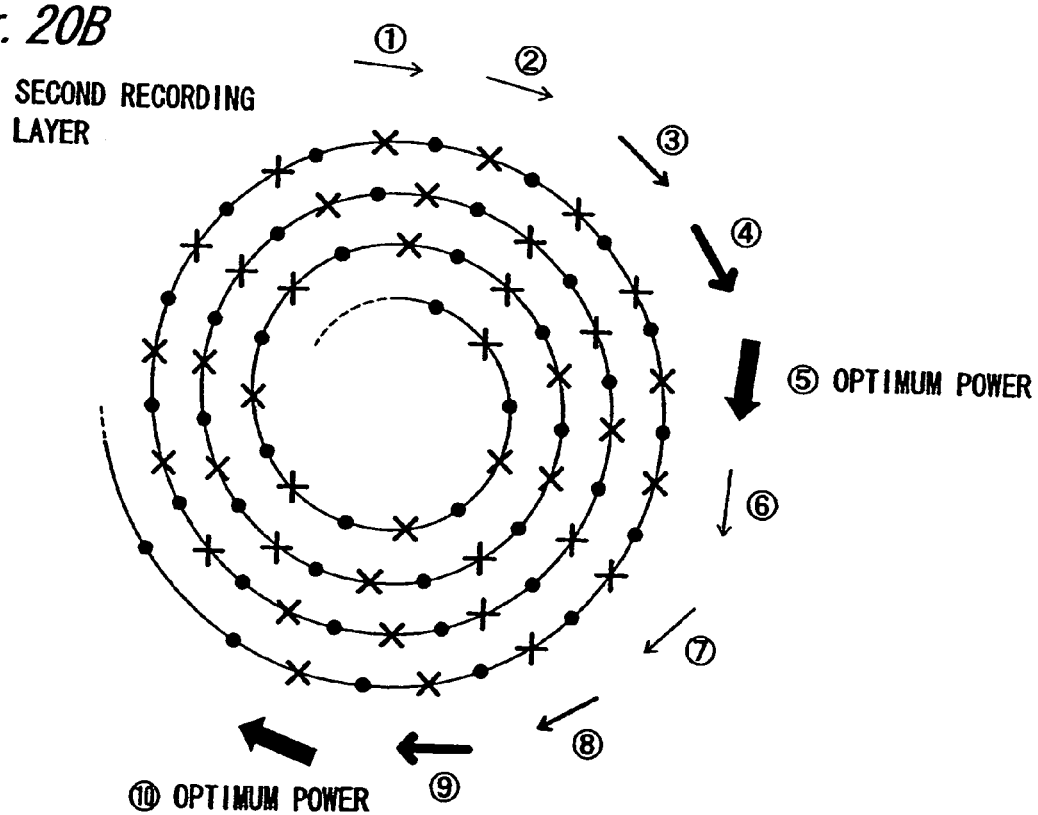
Figure 21A:
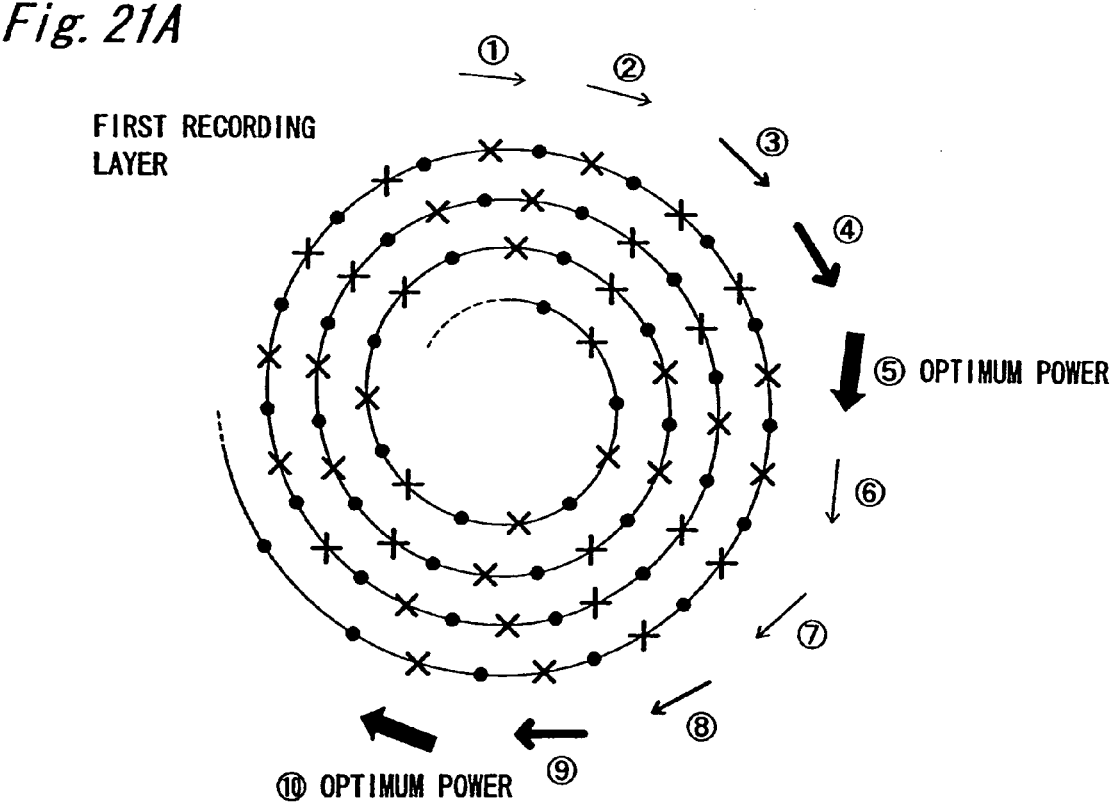
FIGS. 21A and 22B are diagrams explaining other mode in the light spot moving direction and the direction of using test recording area on first and second recording layers of a multilayer optical disc, respectively.
Figure 21B:
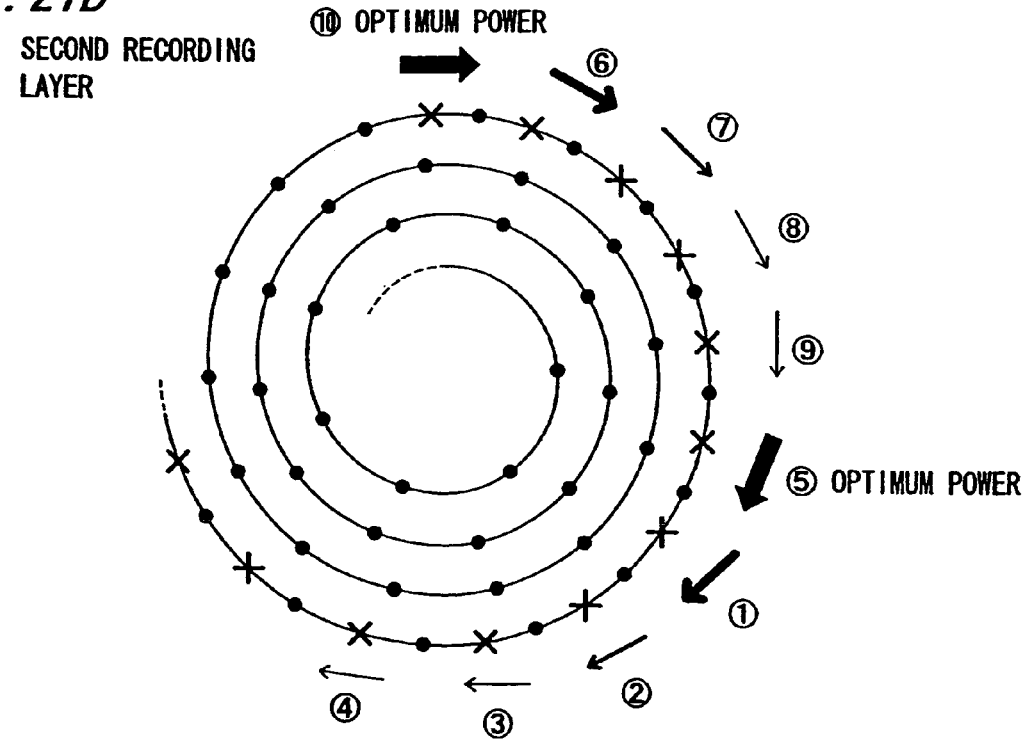
Figure 22A:
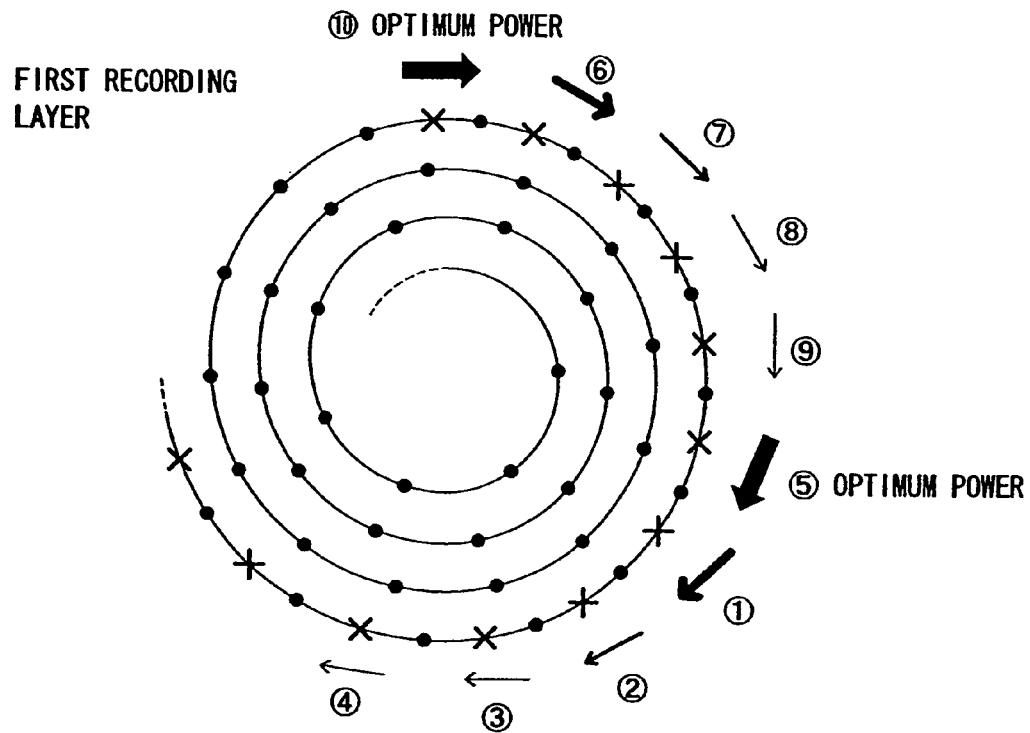
Figure 22B:
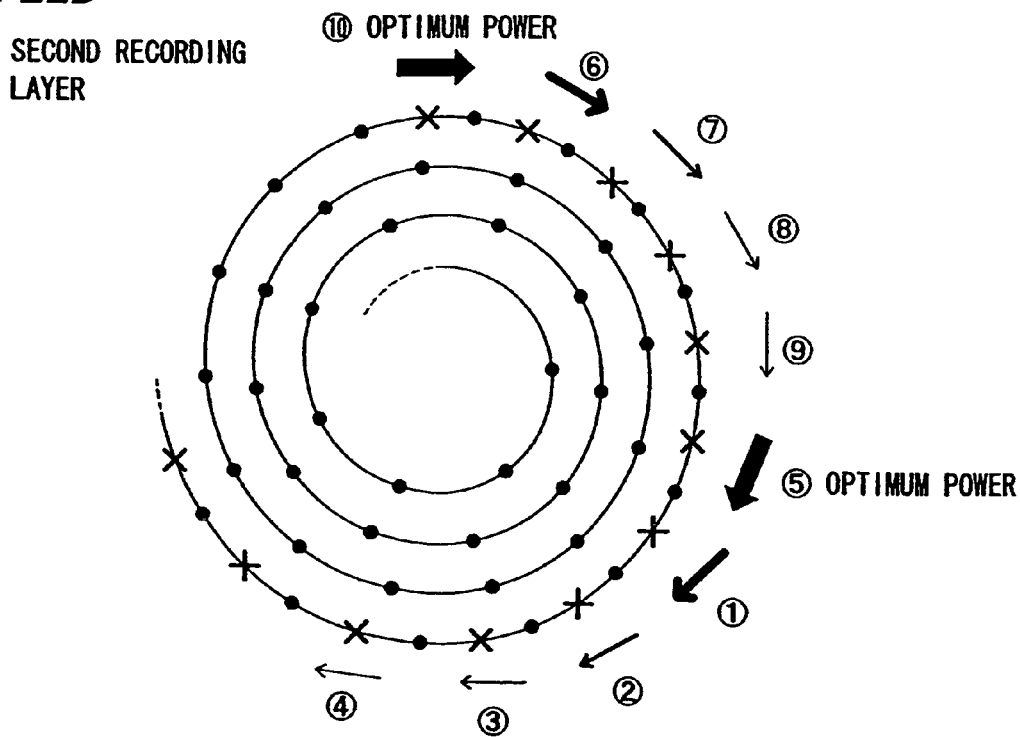

FIG. 18 is the table showing various modes concerning the light spot moving direction, test recording area using direction, power changing direction and so on in the multi-layer optical disc 101b. FIGS. 19A with 19B through 26A with 26B are diagrams schematically explaining various modes (A) through (H) shown in FIG. 18, respectively. In FIGS. 19A with 19B through 26A with 26B, arrow marks are affixed to sectors to which the information has been recorded in the latest two power learnings, and number is assigned in order of recording. In this case, the thickness of the arrow mark indicates the size of the recording power except No. 5 and No. 10. That is, the thicker the arrow mark, the greater is the recording power. The test recording may be started from either the first or the second recording layer.

Figure 23A:
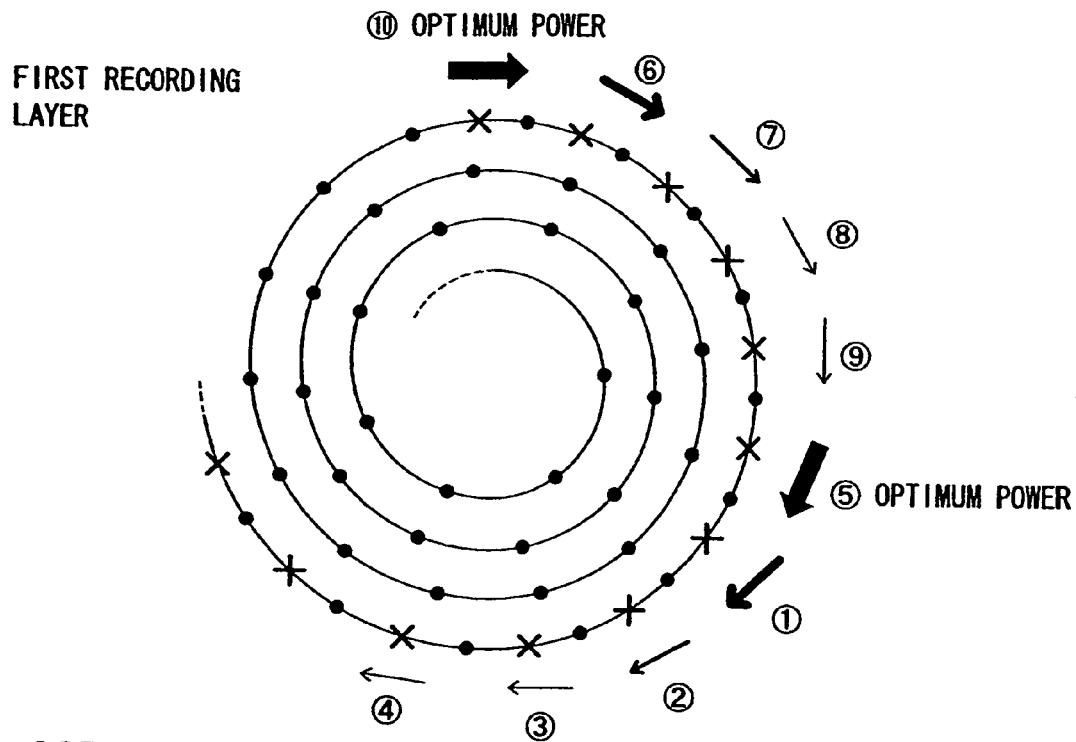
FIGS. 23A and 23B are diagrams explaining other mode in the light spot moving direction and the direction of using test recording area on first and second recording layers of a multilayer optical disc, respectively.
Figure 23B:
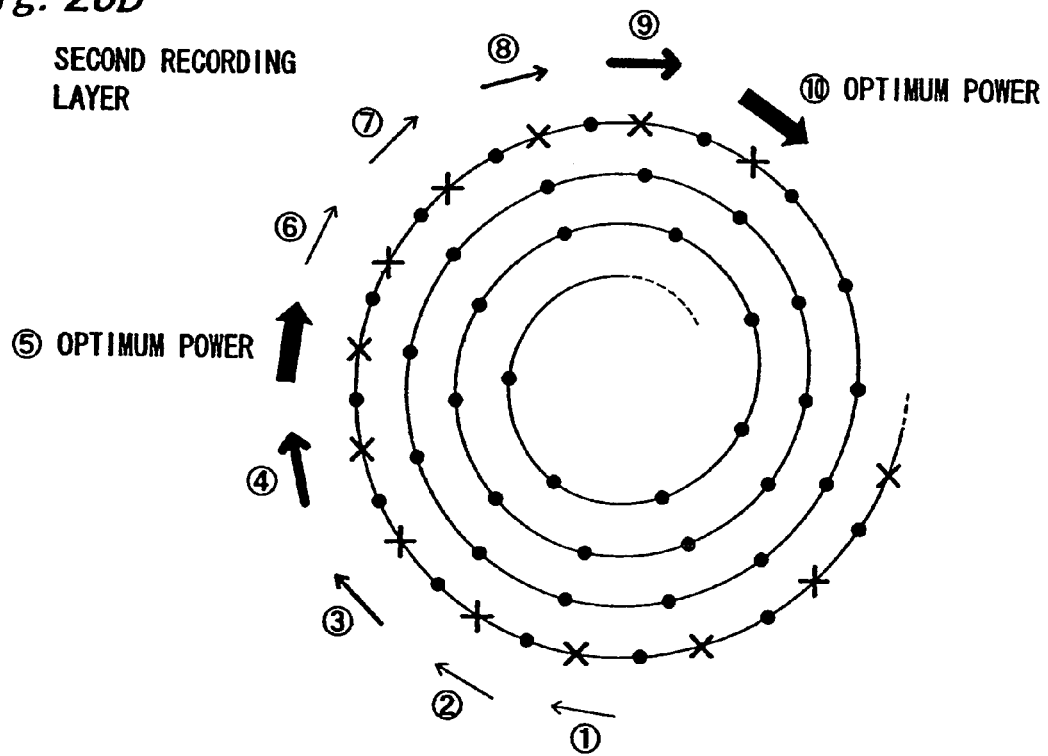
Figure 24A:
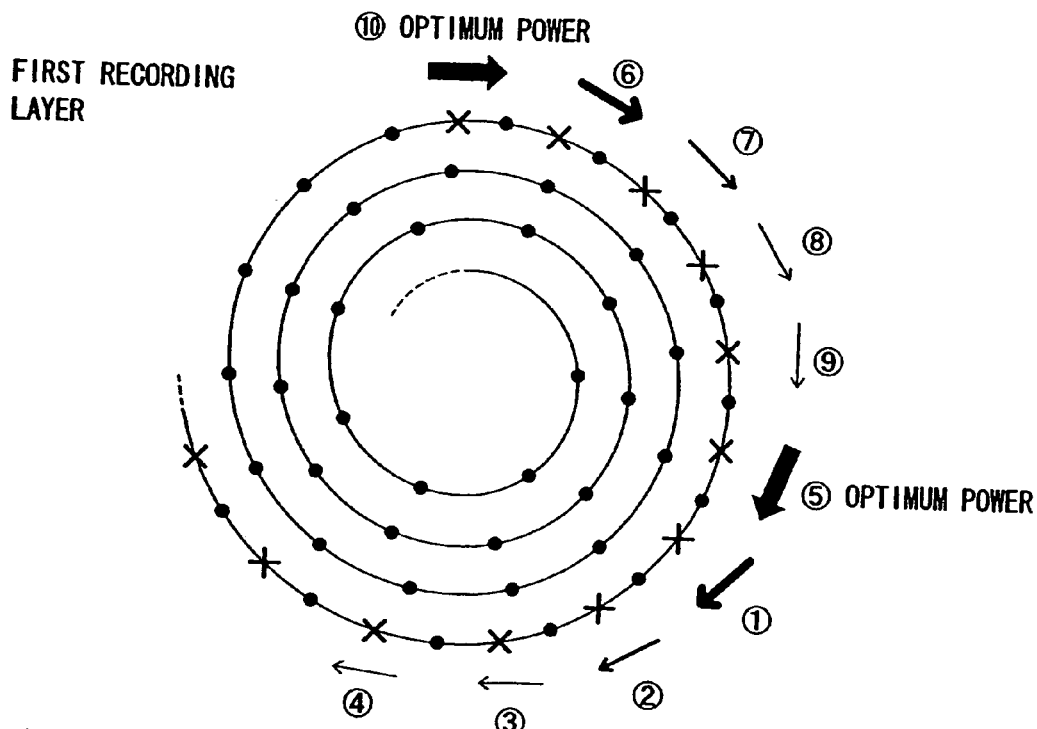
FIGS. 24A and 24B are diagrams explaining other mode in the light spot moving direction and the direction of using test recording area on first and second recording layers of a multilayer optical disc, respectively.
Figure 24B:
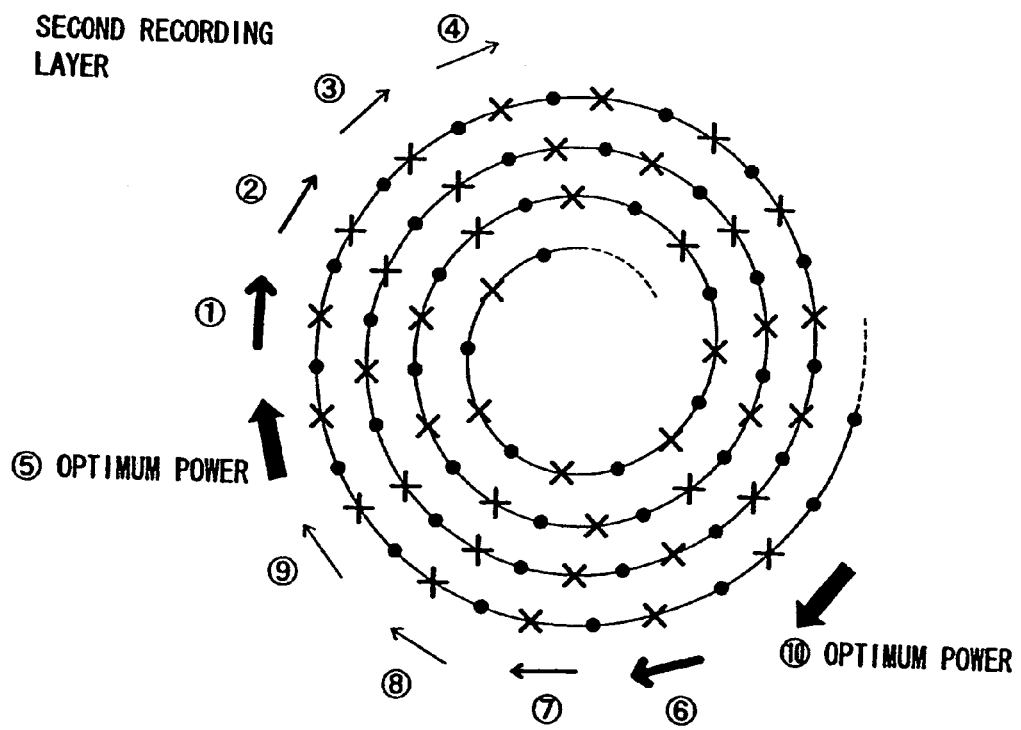
Figure 25A:
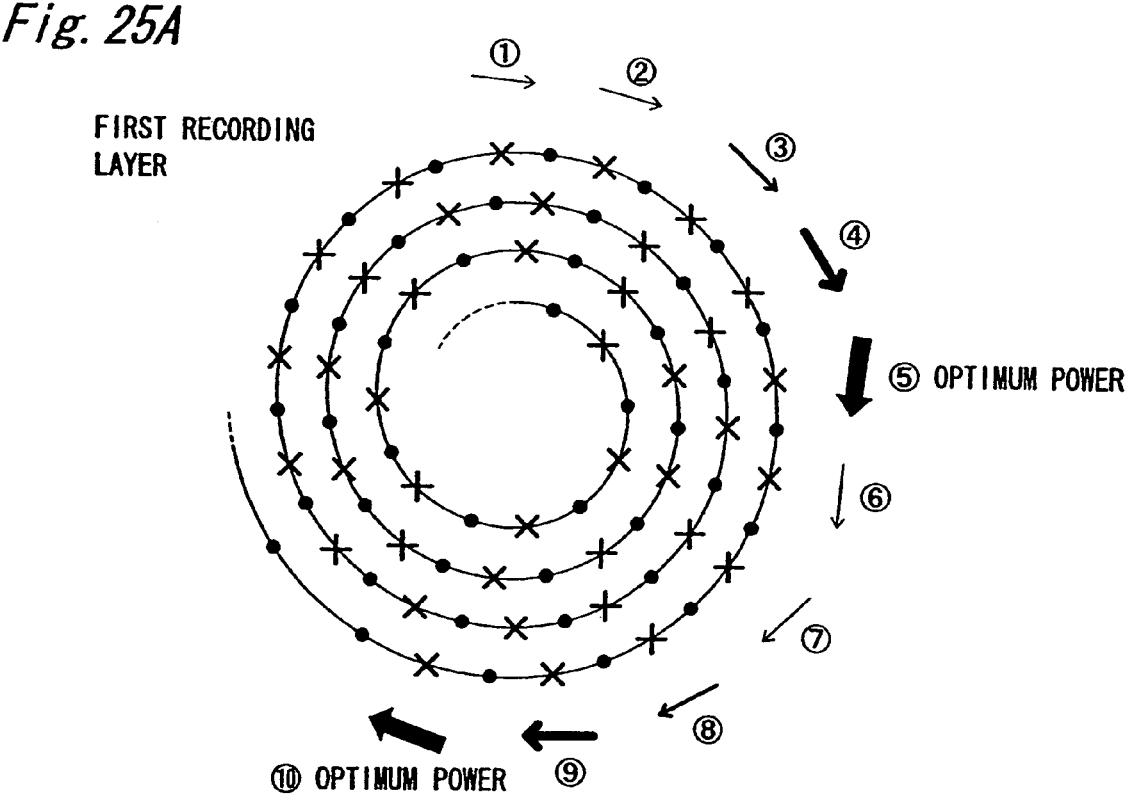
FIGS. 25A and 25B are diagrams explaining other mode in the light spot moving direction and the direction of using test recording area on first and second recording layers of a multilayer optical disc, respectively.
Figure 25B:
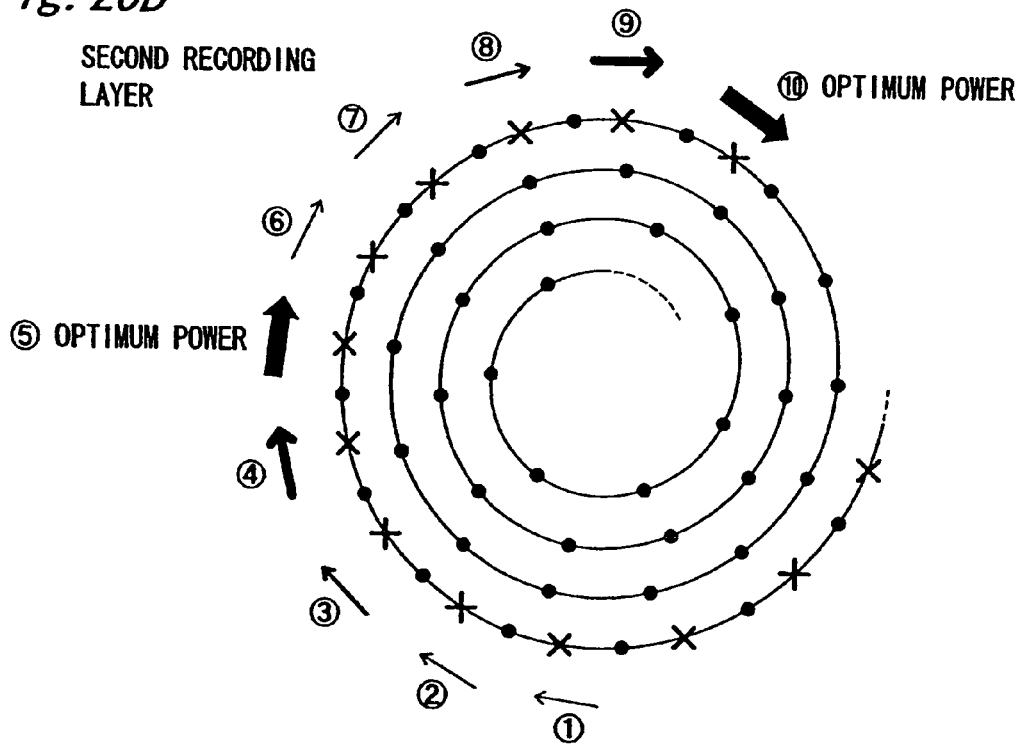
Figure 26A:
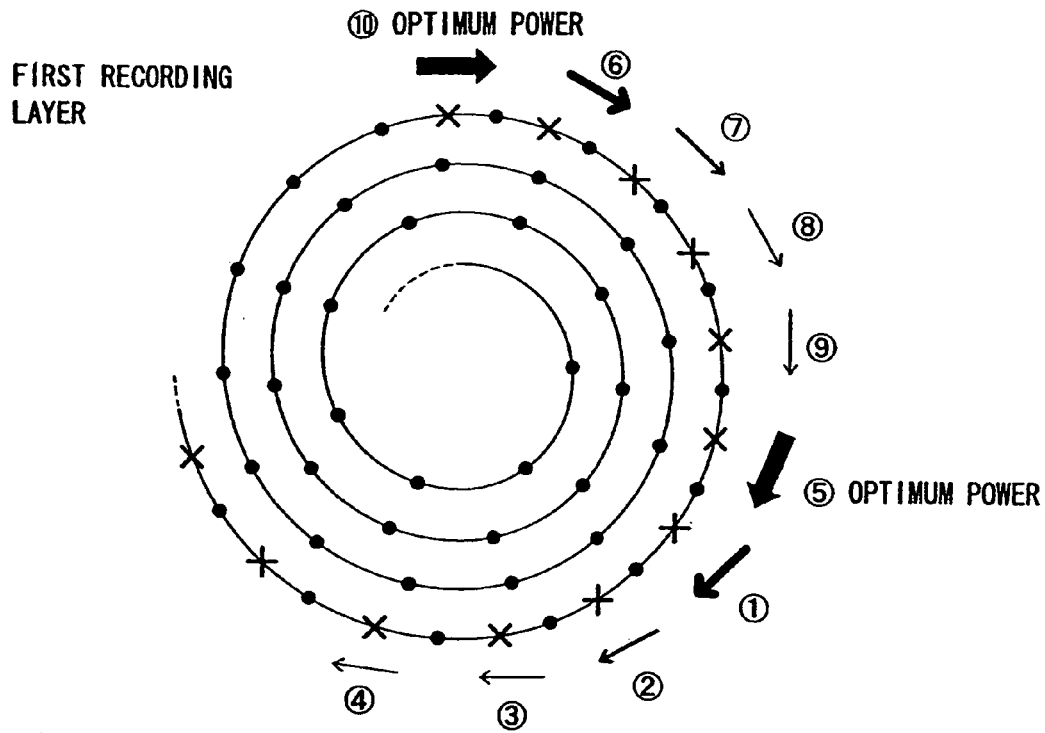
FIGS. 26A and 26B are diagrams explaining other mode in the light spot moving direction and the direction of using test recording area on first and second recording layers of a multilayer optical disc, respectively.
Figure 26B:
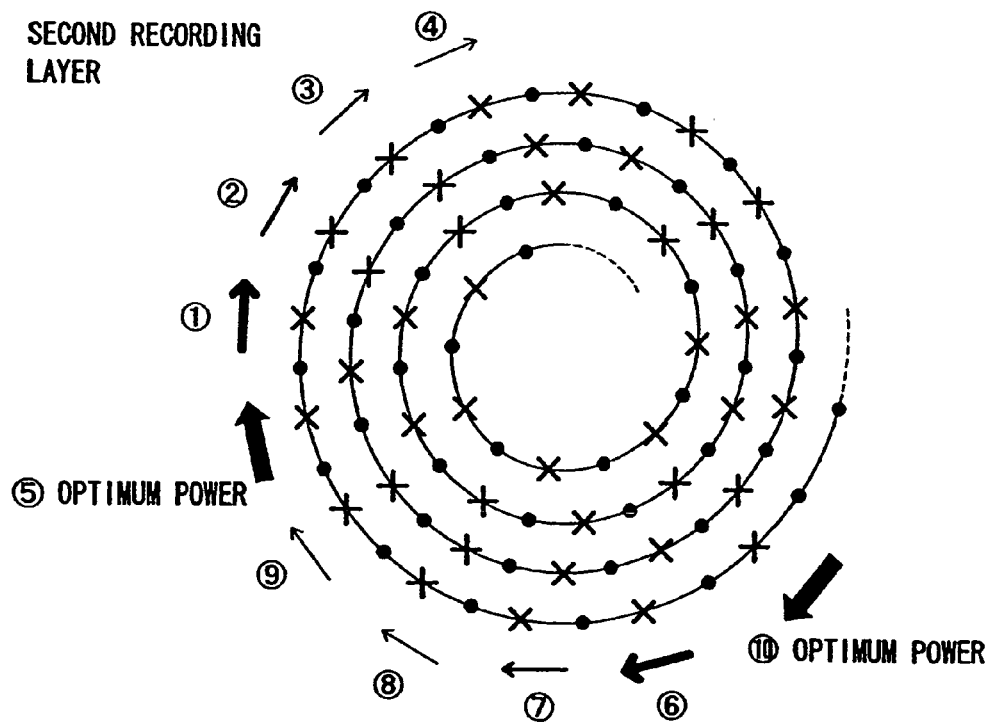

In the modes shown in FIGS. 19A with 19B through 22A with 22B, that is, cases (A) through (D), the light spot moving direction is same between the first and the second recording layers. For example, in the first recording layer, recording is done from inner periphery to outer periphery, and in the second recording layer, recording is also done from inner periphery to outer periphery. In the modes shown in FIGS. 23A with 23B through 26A with 26B, that is, cases (E) through (H), the light spot moving direction is opposite between the first and the second recording layers. For example, in the first recording layer, recording is done from inner periphery to outer periphery, while in the second recording layer, from outer periphery to inner periphery.

According to configuration as described above, in multi-layer optical discs, there achieved are effects in that the light pickup does not need to return from outer periphery to inner periphery at the changeover of the recording layer when continuous data is recorded across two recording layers.

According to the present invention, recording data to the area adjacent to the area in which test recording is done, with the power greater than the recording power determined by test recording. Thus, it is possible to surely prevent the used area from being mistaken for the unused area, and to definitely detect the unused area, as well as to shorten the searching time of the unused area, thereby achieving increased speed of recording process.

In addition, It is possible to more accurately search the border between the unused area and the used area by updating the recording power from the high power to the low power, in case that the light spot moves in the direction from inner periphery to outer periphery, the test recording area is used from the outer peripheral, and test recording is carried out while updating the recording power for each predetermined range.

Furthermore, when recording is interrupted while test recording in the predetermined area, re-recording in the predetermined area including the interrupted area allows the recording area to be continued, and thus it is possible to prevent the test-recorded area from being mistaken for the test-recordable area (that is, unused area).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The present disclosure relates to subject matter contained in Japanese Patent Application No. 2001-092487, filed on Mar. 28, 2001, which are expressly incorporated herein by reference in its entirety.

What is claimed is:

1. An optical disk comprising:
   a recording layer having a read/write direction from an outer periphery of the optical disk to an inner periphery of the optical disk;
   a test recording area on the recording layer, the test recording area including a plurality of sections to be used consecutively from an inner periphery of the optical disk to an outer periphery of the optical disk for performing test recording; and
   a data area in which user data is to be written with a recording power determined by the test recording.

2. A method of reproducing the optical disk according to claim 1, the method comprising:
   reproducing the user data from the data area.

* * * * *